US011588624B2

(12) United States Patent
Ganguli et al.

(10) Patent No.: US 11,588,624 B2
(45) Date of Patent: Feb. 21, 2023

(54) TECHNOLOGIES FOR LOAD BALANCING A NETWORK

(71) Applicant: Intel Corporation, Santa Clara, CA (US)

(72) Inventors: Mrittika Ganguli, Tempe, AZ (US); Yadong Li, Portland, OR (US); Michael Orr, Sunnyvale, CA (US); Anjaneya Reddy Chagam Reddy, Chandler, AZ (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 17/001,502

(22) Filed: Aug. 24, 2020

(65) Prior Publication Data

US 2020/0389296 A1    Dec. 10, 2020

Related U.S. Application Data

(63) Continuation of application No. 16/045,345, filed on Jul. 25, 2018, now Pat. No. 10,756,886.
(Continued)

(30) Foreign Application Priority Data

Aug. 30, 2017  (IN) .............................. 201741030632

(51) Int. Cl.
*H04L 47/11* (2022.01)
*H04L 9/08* (2006.01)
(Continued)

(52) U.S. Cl.
CPC ........ *H04L 9/0819* (2013.01); *B25J 15/0014* (2013.01); *G06F 1/183* (2013.01); *G06F 1/20* (2013.01); *G06F 3/0604* (2013.01); *G06F 3/065* (2013.01); *G06F 3/0605* (2013.01); *G06F 3/067* (2013.01); *G06F 3/0611* (2013.01); *G06F 3/0613* (2013.01); *G06F 3/0629* (2013.01);
(Continued)

(58) Field of Classification Search
CPC ............ H04B 49/10; H04L 47/11; H04L 9/08
See application file for complete search history.

(56) References Cited

U.S. PATENT DOCUMENTS

| 2009/0003206 A1 | 1/2009 | Bitar |
| 2011/0271007 A1 | 11/2011 | Wang et al. |

(Continued)

OTHER PUBLICATIONS

Advisory Action for U.S. Appl. No. 16/045,345, dated Mar. 19, 2020, 3 pages.
(Continued)

*Primary Examiner* — Sulaiman Nooristany
(74) *Attorney, Agent, or Firm* — Compass IP Law PC

(57) ABSTRACT

Technologies for load balancing a storage network include a system. The system includes circuitry to adjust routing rules in a network interface controller to deliver a packet from one of multiple uplinks to one of any physical functions, circuitry to remap, in response to a failure of a switch, a port from one physical function to another physical function, and circuitry to communicate control data between a software defined network controller and one or more agents in one or more host endpoints with a hierarchical distributed hashing table.

18 Claims, 23 Drawing Sheets

Related U.S. Application Data

(60) Provisional application No. 62/633,307, filed on Feb. 21, 2018, provisional application No. 62/584,401, filed on Nov. 10, 2017.

(51) Int. Cl.

| | | |
|---|---|---|
| G06F 3/06 | (2006.01) | |
| G06F 9/50 | (2006.01) | |
| H04L 69/12 | (2022.01) | |
| H04L 69/32 | (2022.01) | |
| G06F 16/25 | (2019.01) | |
| G06F 16/2453 | (2019.01) | |
| H04L 49/9005 | (2022.01) | |
| G11C 8/12 | (2006.01) | |
| G11C 29/02 | (2006.01) | |
| H04L 41/0896 | (2022.01) | |
| G06F 30/34 | (2020.01) | |
| B25J 15/00 | (2006.01) | |
| G06F 1/18 | (2006.01) | |
| G06F 1/20 | (2006.01) | |
| G06F 11/34 | (2006.01) | |
| G06F 15/78 | (2006.01) | |
| H04L 41/5025 | (2022.01) | |
| H04L 67/1008 | (2022.01) | |
| H05K 7/14 | (2006.01) | |
| H05K 7/18 | (2006.01) | |
| H05K 7/20 | (2006.01) | |
| H04L 67/1001 | (2022.01) | |
| G11C 29/36 | (2006.01) | |
| G11C 29/38 | (2006.01) | |
| G11C 29/44 | (2006.01) | |
| G06F 16/22 | (2019.01) | |
| G06F 16/2455 | (2019.01) | |
| G06F 12/02 | (2006.01) | |
| G06F 12/14 | (2006.01) | |
| G06F 13/16 | (2006.01) | |
| G06F 15/173 | (2006.01) | |
| G06F 13/40 | (2006.01) | |
| G06F 13/42 | (2006.01) | |
| G06F 9/448 | (2018.01) | |
| G06F 9/28 | (2006.01) | |
| G06F 15/16 | (2006.01) | |
| H04L 41/0893 | (2022.01) | |
| H04L 69/22 | (2022.01) | |
| H04L 69/321 | (2022.01) | |
| H04L 41/0213 | (2022.01) | |
| H04L 41/0668 | (2022.01) | |
| H04L 41/0677 | (2022.01) | |
| H04L 45/28 | (2022.01) | |
| H04L 45/7453 | (2022.01) | |
| H04L 47/125 | (2022.01) | |
| H04L 49/00 | (2022.01) | |
| H04L 49/351 | (2022.01) | |
| G06F 9/4401 | (2018.01) | |
| G06F 9/445 | (2018.01) | |
| G06F 12/06 | (2006.01) | |
| G06F 16/23 | (2019.01) | |
| G06F 16/248 | (2019.01) | |
| G06F 16/901 | (2019.01) | |
| G06F 16/11 | (2019.01) | |
| G06F 9/44 | (2018.01) | |
| G06F 9/48 | (2006.01) | |
| G06F 21/10 | (2013.01) | |
| G06N 3/063 | (2023.01) | |
| G06Q 10/0631 | (2023.01) | |
| G06Q 30/0283 | (2023.01) | |
| H04L 41/14 | (2022.01) | |
| H04L 41/5019 | (2022.01) | |
| H04L 49/40 | (2022.01) | |
| H04L 9/40 | (2022.01) | |
| G06F 12/0802 | (2016.01) | |
| G06F 12/1045 | (2016.01) | |

(52) U.S. Cl.
CPC .......... *G06F 3/0631* (2013.01); *G06F 3/0632* (2013.01); *G06F 3/0644* (2013.01); *G06F 3/0647* (2013.01); *G06F 3/0659* (2013.01); *G06F 3/0673* (2013.01); *G06F 3/0683* (2013.01); *G06F 3/0685* (2013.01); *G06F 9/28* (2013.01); *G06F 9/445* (2013.01); *G06F 9/4406* (2013.01); *G06F 9/4411* (2013.01); *G06F 9/4494* (2018.02); *G06F 9/505* (2013.01); *G06F 9/5044* (2013.01); *G06F 9/5088* (2013.01); *G06F 11/3442* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 15/7807* (2013.01); *G06F 15/7867* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/248* (2019.01); *G06F 16/2453* (2019.01); *G06F 16/2455* (2019.01); *G06F 16/24553* (2019.01); *G06F 16/25* (2019.01); *G06F 16/9014* (2019.01); *G06F 30/34* (2020.01); *G11C 8/12* (2013.01); *G11C 29/028* (2013.01); *G11C 29/36* (2013.01); *G11C 29/38* (2013.01); *G11C 29/44* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 41/5025* (2013.01); *H04L 45/28* (2013.01); *H04L 45/7453* (2013.01); *H04L 47/11* (2013.01); *H04L 47/125* (2013.01); *H04L 49/30* (2013.01); *H04L 49/351* (2013.01); *H04L 49/9005* (2013.01); *H04L 67/1001* (2022.05); *H04L 67/1008* (2013.01); *H04L 69/12* (2013.01); *H04L 69/22* (2013.01); *H04L 69/32* (2013.01); *H04L 69/321* (2013.01); *H05K 7/1489* (2013.01); *H05K 7/18* (2013.01); *H05K 7/20209* (2013.01); *H05K 7/20736* (2013.01); *G06F 9/44* (2013.01); *G06F 9/4401* (2013.01); *G06F 9/4856* (2013.01); *G06F 9/5061* (2013.01); *G06F 12/0802* (2013.01); *G06F 12/1054* (2013.01); *G06F 12/1063* (2013.01); *G06F 13/4022* (2013.01); *G06F 21/105* (2013.01); *G06F 2200/201* (2013.01); *G06F 2201/85* (2013.01); *G06F 2209/509* (2013.01); *G06F 2212/1044* (2013.01); *G06F 2212/1052* (2013.01); *G06F 2212/601* (2013.01); *G06F 2213/0064* (2013.01); *G06N 3/063* (2013.01); *G06Q 10/0631* (2013.01); *G06Q 30/0283* (2013.01); *H04L 41/14* (2013.01); *H04L 41/5019* (2013.01); *H04L 49/40* (2013.01); *H04L 63/0428* (2013.01); *H05K 7/1498* (2013.01)

(56) References Cited

U.S. PATENT DOCUMENTS

| | | |
|---|---|---|
| 2013/0339955 A1 | 12/2013 | Prawer et al. |
| 2016/0197831 A1* | 7/2016 | De Foy .............. H04L 45/7453 |
| | | 370/392 |
| 2016/0380865 A1* | 12/2016 | Dubai .................. H04L 43/026 |
| | | 709/224 |
| 2017/0257275 A1 | 9/2017 | Atyam et al. |
| 2017/0289067 A1 | 10/2017 | Lu et al. |
| 2018/0027093 A1 | 1/2018 | Guim et al. |

OTHER PUBLICATIONS

Extended European search report in European patent application No. 19158671.8, dated May 24, 2019 (10 pages).
Final Office Action for U.S. Appl. No. 16/045,345, dated Dec. 13, 2019, 13 pages.
First Office Action for U.S. Appl. No. 16/045,345, dated Jul. 9, 2019, 9 pages.
Notice of Allowance for U.S. Appl. No. 16/045,345, dated Apr. 15, 2020, 7 pages.
Office Action in European patent application No. 19158671.8, dated Jul. 6, 2020 (9 pages).
Yanfang Le et al., "UNO: Unifying Host and Smart NIC Offload for Flexible Packet Processing," Proceedings of SOCC 17, pp. 506-519 (Sep. 27, 2017).
Jain, Raj, "Data Center Networks: Virtual Bridging", Washington University in Saint Louis, © 2013 Raj Jain, Oct. 16, 2013, 33 pages.

* cited by examiner

| Type | No. of Prop | CPU | NIC PF | Port | Switch Port | Ply ID | Switch ID | Spine Switch ID | ... | Power | QoS | Congestion | Data Packet |
FIG. 22 — 2200
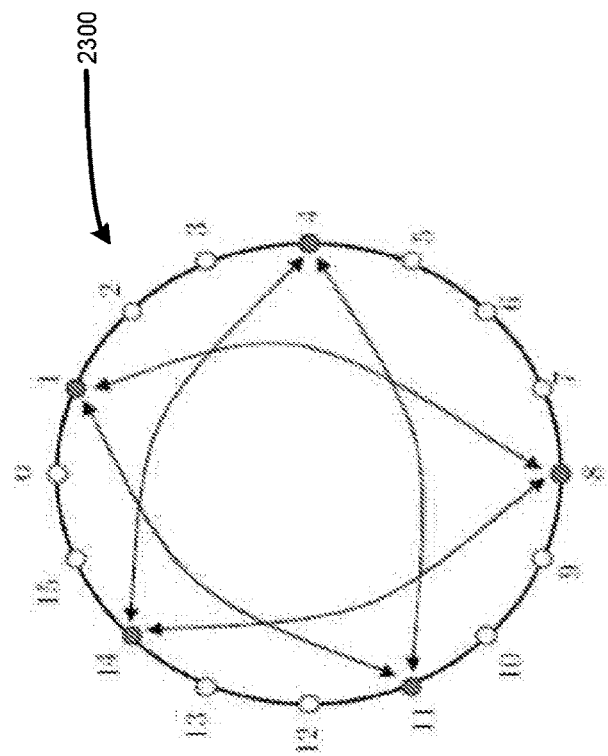
FIG. 23 — 2300

TECHNOLOGIES FOR LOAD BALANCING A NETWORK

CROSS-REFERENCE TO RELATED APPLICATIONS

The present application is a continuation application of U.S. patent application Ser. No. 16/045,345, filed Jul. 25, 2018, which claims the benefit of Indian Provisional Patent Application No. 201741030632, filed Aug. 30, 2017, U.S. Provisional Patent Application No. 62/584,401, filed Nov. 10, 2017, and U.S. Provisional Patent Application No. 62/633,307, filed Feb. 21, 2018.

BACKGROUND

In a data center that includes one or more top of rack (TOR) switches connected to end-point server(s), link based failure and load balancing is typically performed by using mechanisms such as simple network management protocol (SNMP) traps for link failure notification, equal-cost multi-path routing (ECMP) for finding the next best path, and border gateway protocol (BGP) for routing (e.g., finding and disseminating network paths to any desired destination). By contrast, a rack scale-based pod switch environment (e.g., a set of compute, network, storage, and/or other resources) may eliminate TOR switches, and instead, each end point network interface controller (NIC) may be connected to two or more switches at the end of a row. In such a configuration, load balancing using SNMP, ECMP, and BGP, and the like are not as effective. In the pod switch environment, load balancing after link failure is especially important in order to maintain a target quality of service.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 22 is a simplified block diagram of a packet protocol data unit (PDU) used with a software defined network (SDN);

FIG. 23 is a simplified diagram of a DHT as a loopy network where successor nodes are linked based on a policy.

DETAILED DESCRIPTION OF THE DRAWINGS

Figure 1:
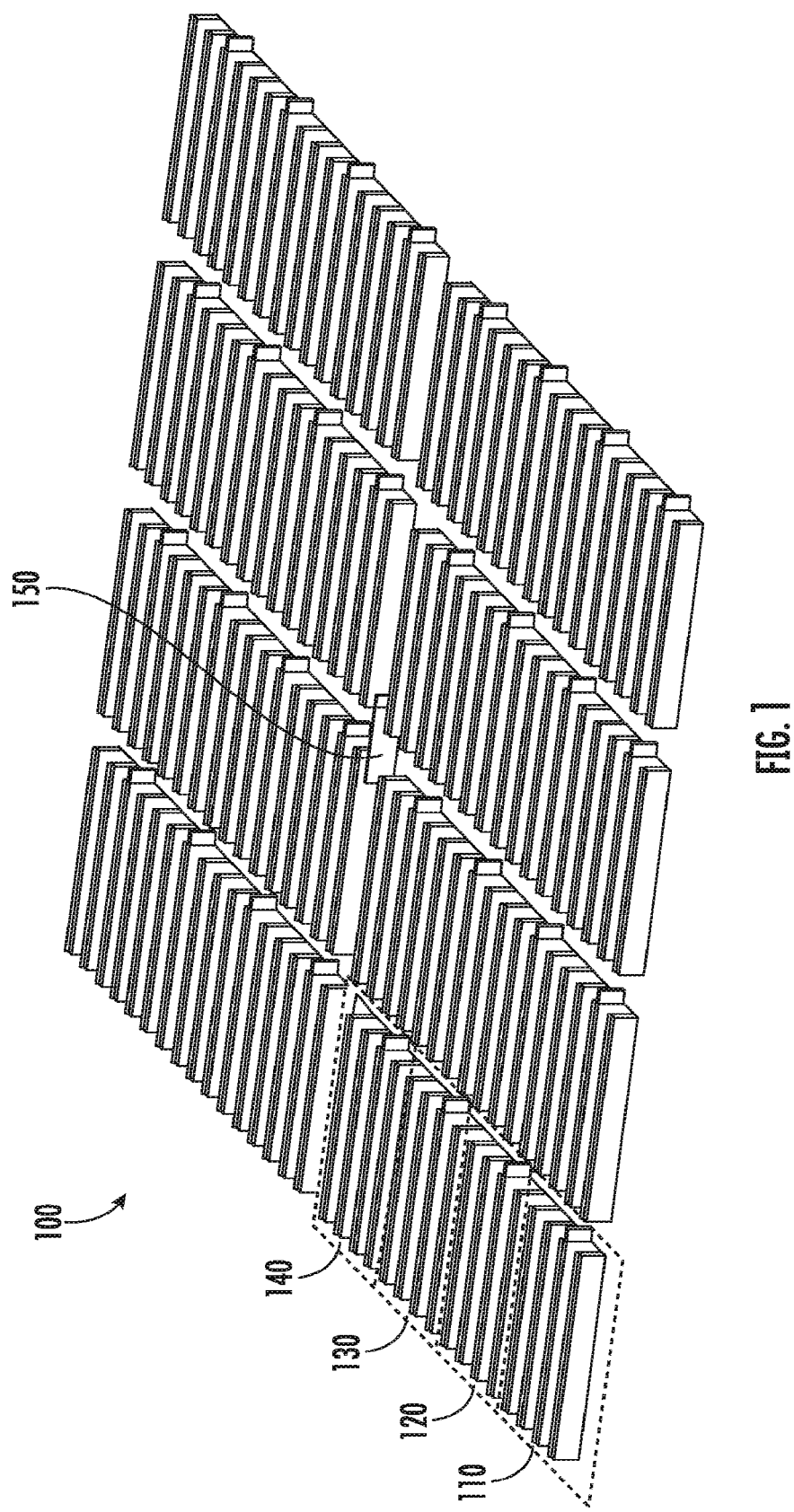
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. As described in more detail herein, each rack houses multiple sleds, which each may be embodied as a compute device, such as a server, that is primarily equipped with a particular type of resource (e.g., memory devices, data storage devices, accelerator devices, general purpose processors). In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. As described in more detail herein, resources within sleds in the data center 100 may be allocated to a group (referred to herein as a "managed node") containing resources from one or more other sleds to be collectively utilized in the execution of a workload. The workload can execute as if the resources belonging to the managed node were located on the same sled. The resources in a managed node may even belong to sleds belonging to different racks, and even to different pods 110, 120, 130, 140. Some resources of a single sled may be allocated to one managed node while other resources of the same sled are allocated to a different managed node (e.g., one processor assigned to one managed node and another processor of the same sled assigned to a different managed node). By disaggregating resources to sleds comprised predominantly of a single type of resource (e.g., compute sleds comprising primarily compute resources, memory sleds containing primarily memory resources), and selectively allocating and deallocating the disaggregated resources to form a managed node assigned to execute a workload, the data center 100 provides more efficient resource usage over typical data centers comprised of hyperconverged servers containing compute, memory, storage and perhaps additional resources). As such, the data center 100 may provide greater performance (e.g., throughput, operations per second, latency, etc.) than a typical data center that has the same number of resources.

Figure 2:
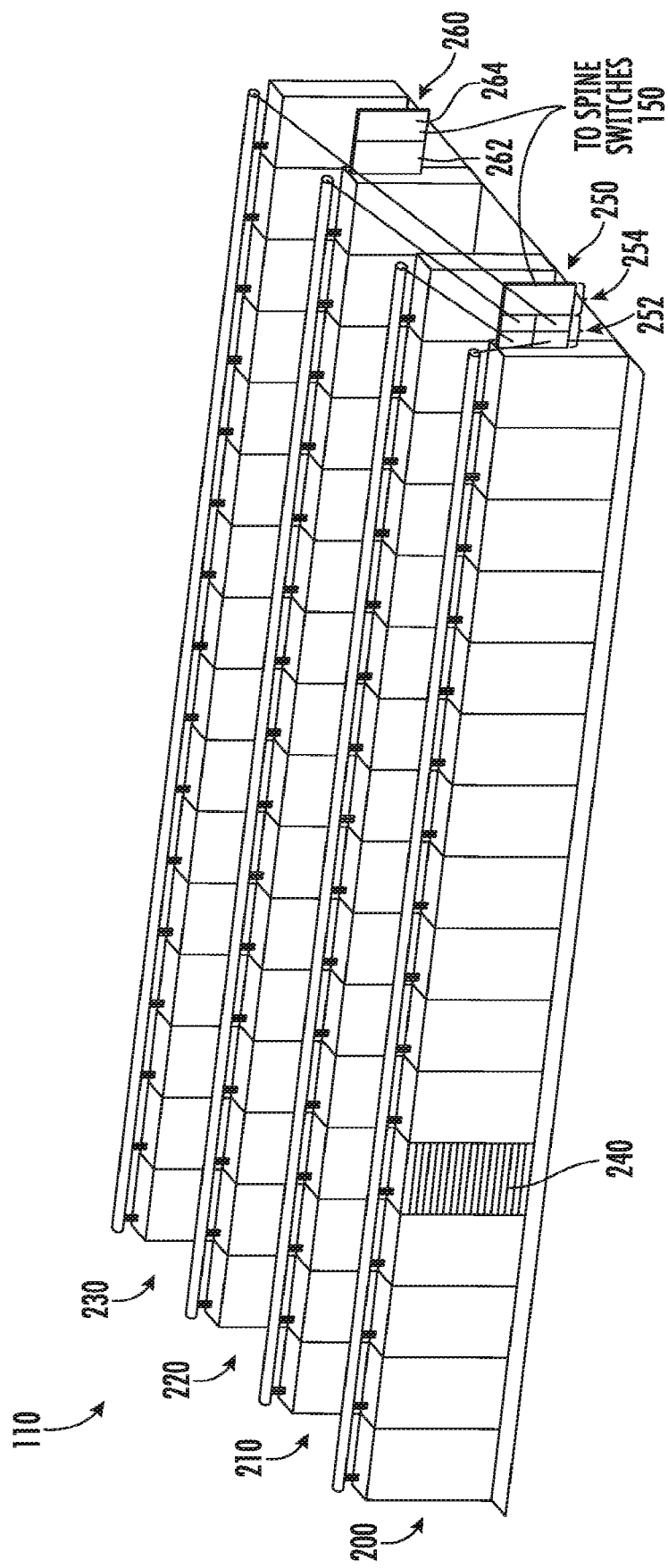
FIG. 2 is a simplified diagram of at least one embodiment of a pod of the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, Infiniband) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to different number of pod switches (e.g., providing even more failover capacity).

Figure 3:
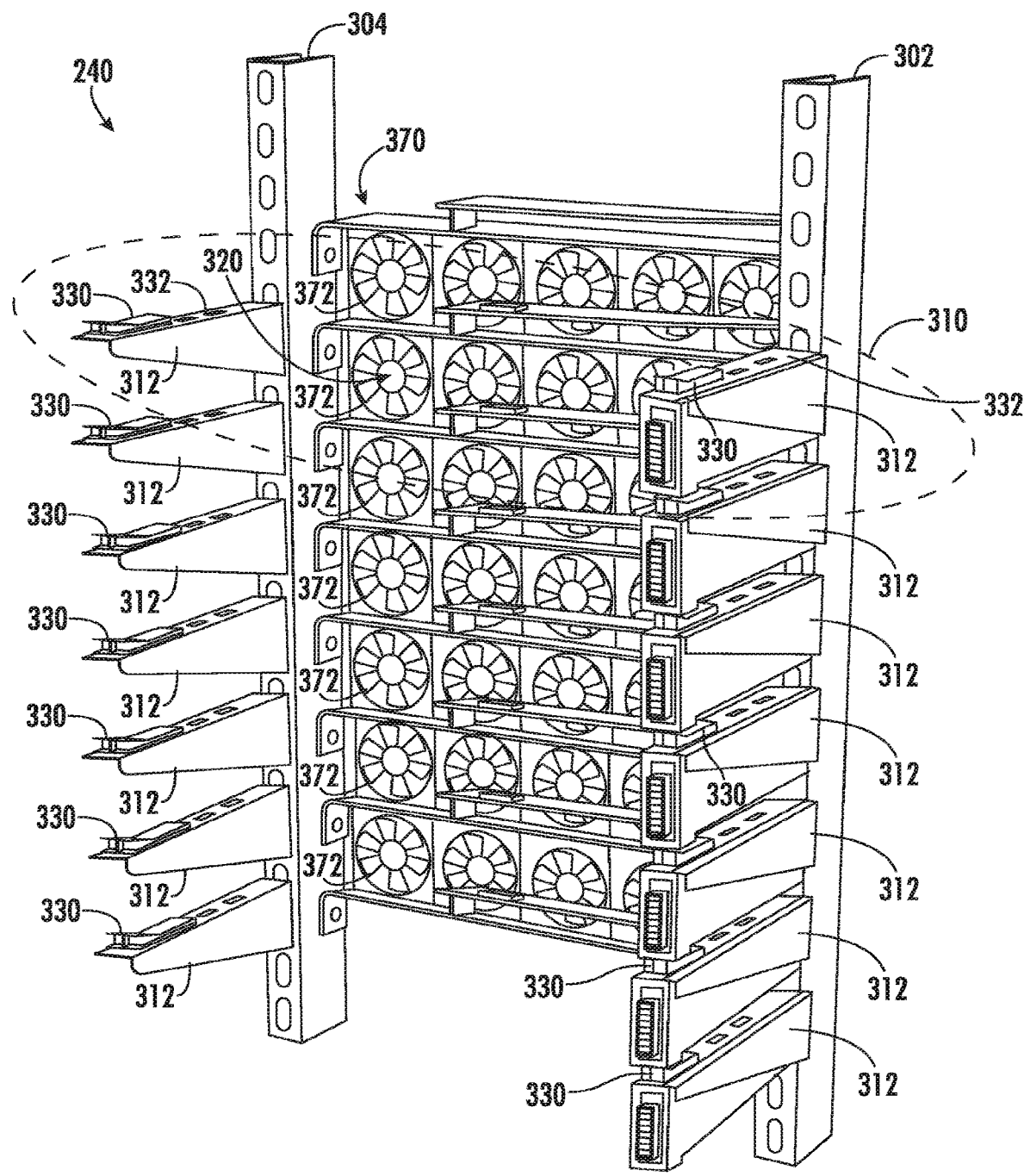
FIG. 3 is a perspective view of at least one embodiment of a rack that may be included in the pod of FIG. 2.
Figure 4:
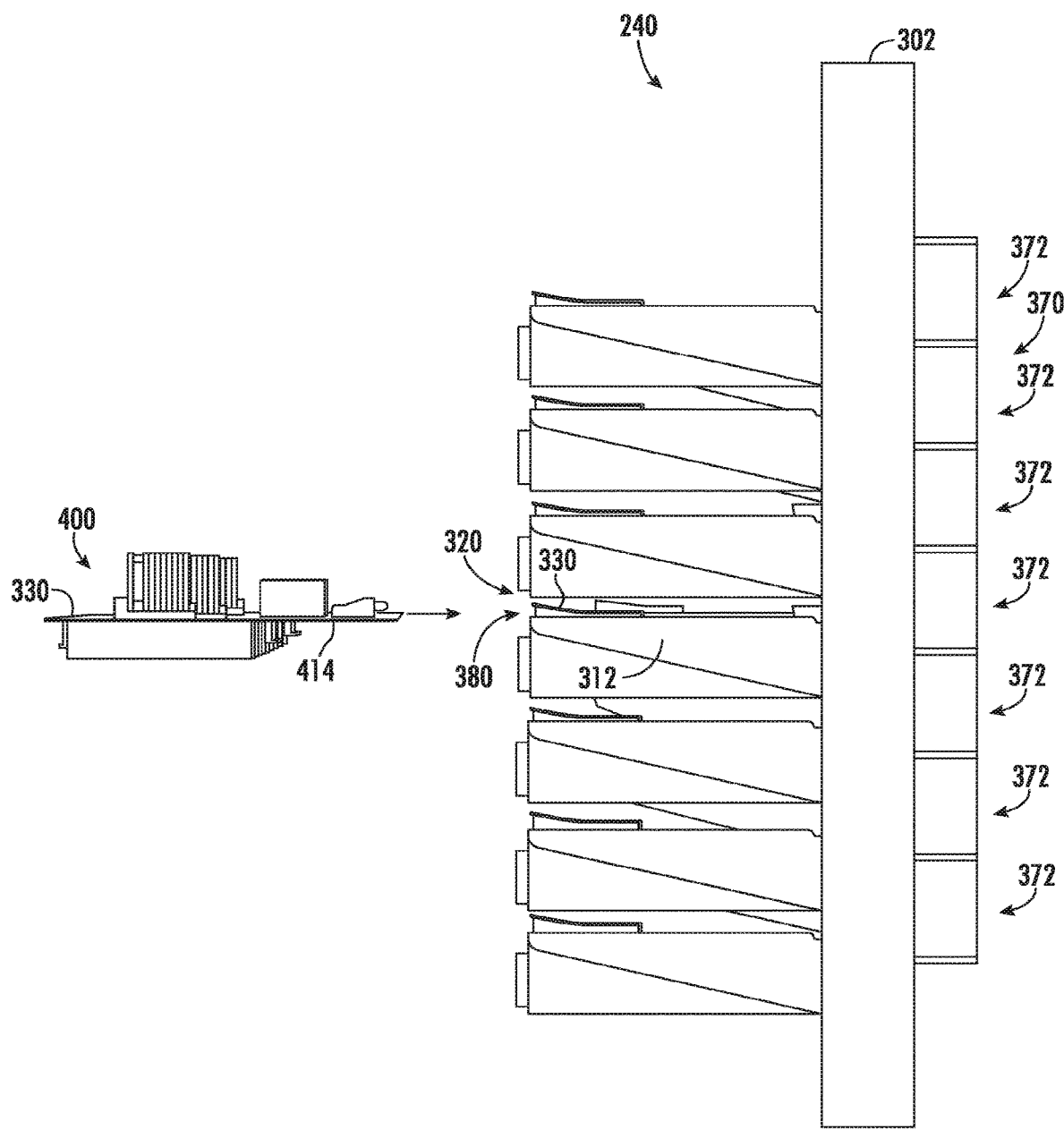
FIG. 4 is a side plan elevation view of the rack of FIG. 3.
Figure 5:
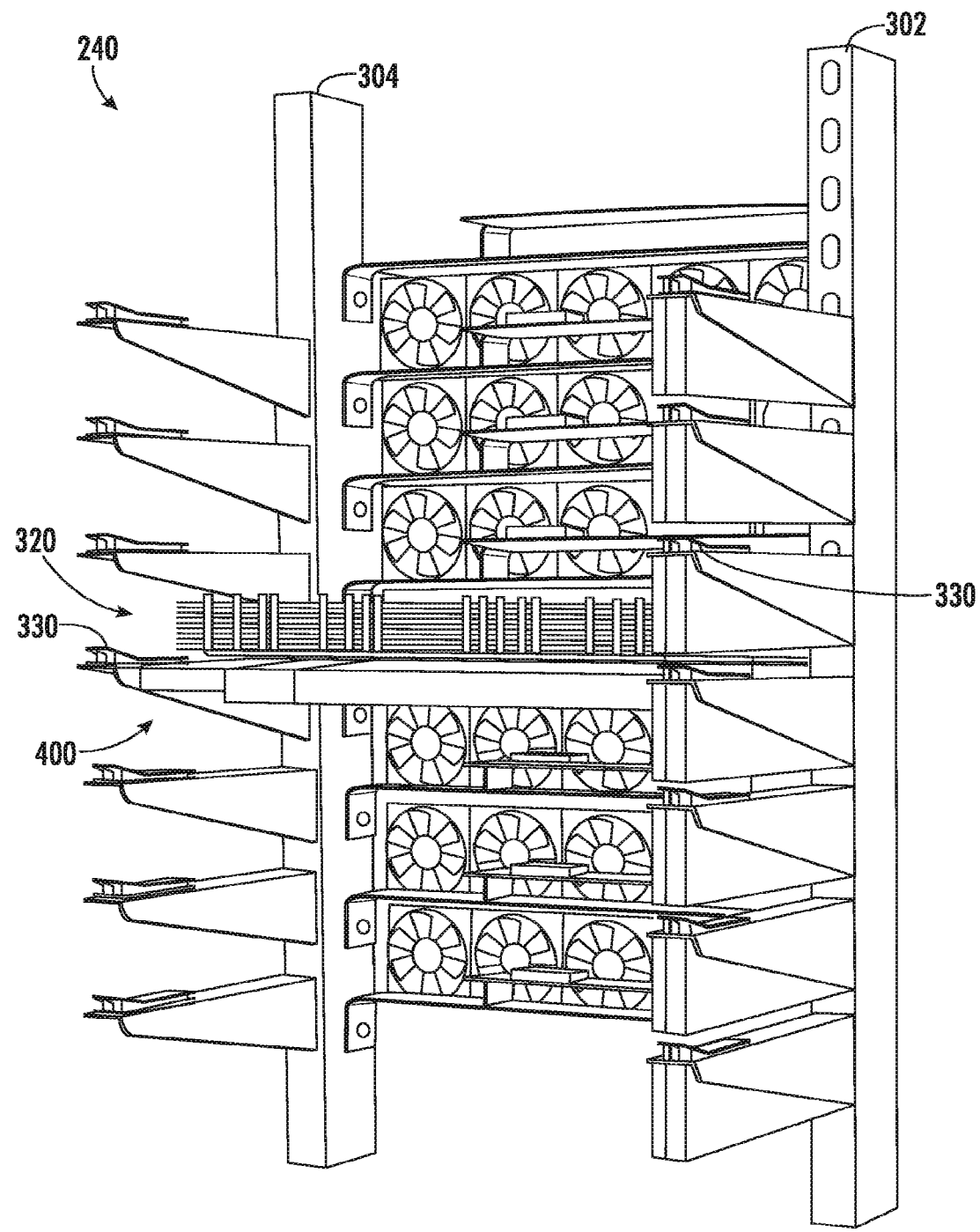
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which the interconnect may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable enters the connector mechanism. Subsequently, the optical fiber inside the cable enters a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240.

Figure 6:
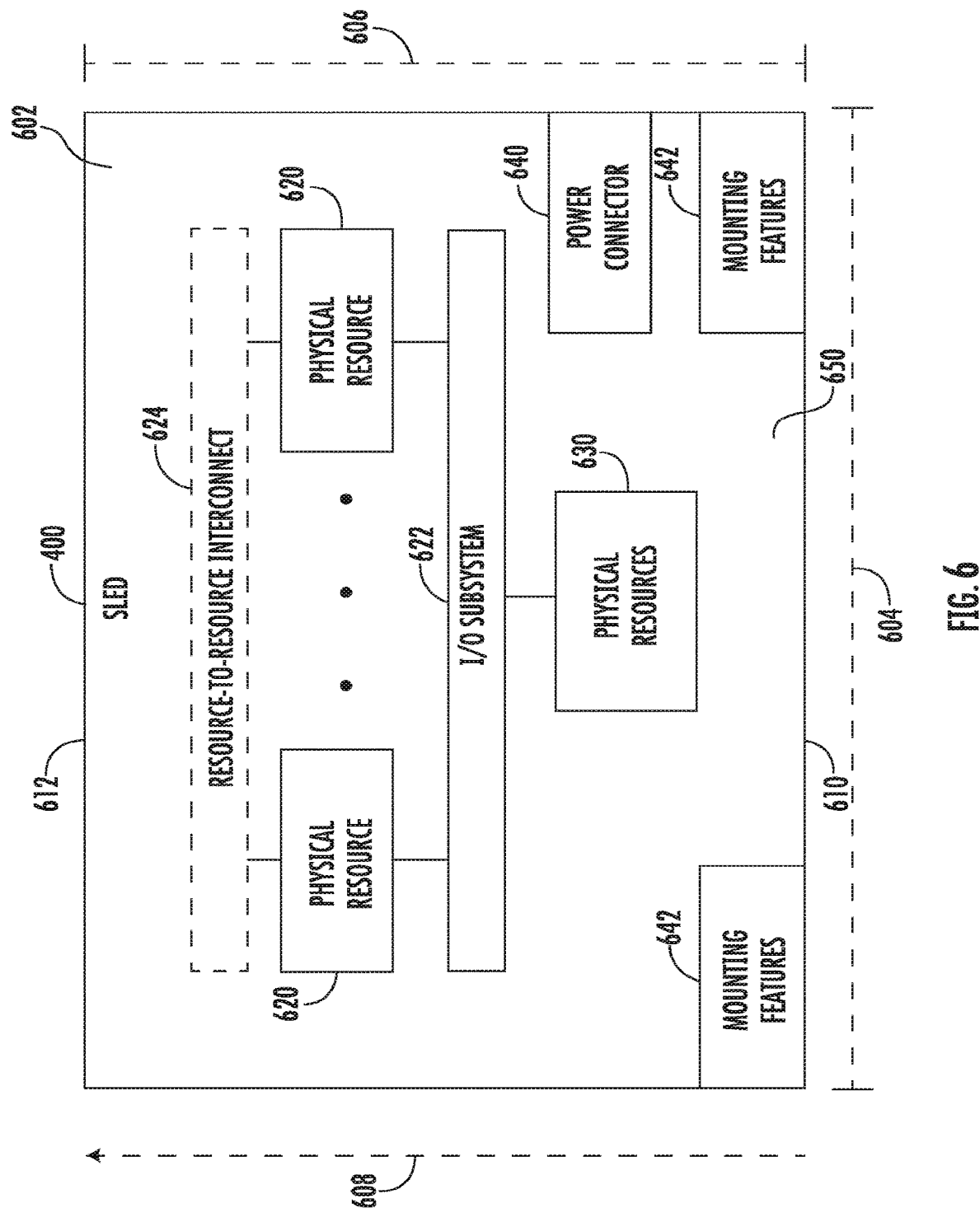
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no backplane (e.g., a backplate of the chassis) to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, power is provided to the processors 820 through vias directly under the processors 820 (e.g., through the bottom side 750 of the chassis-less circuit board substrate 602), providing an increased thermal budget, additional current and/or voltage, and better voltage control over typical boards.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
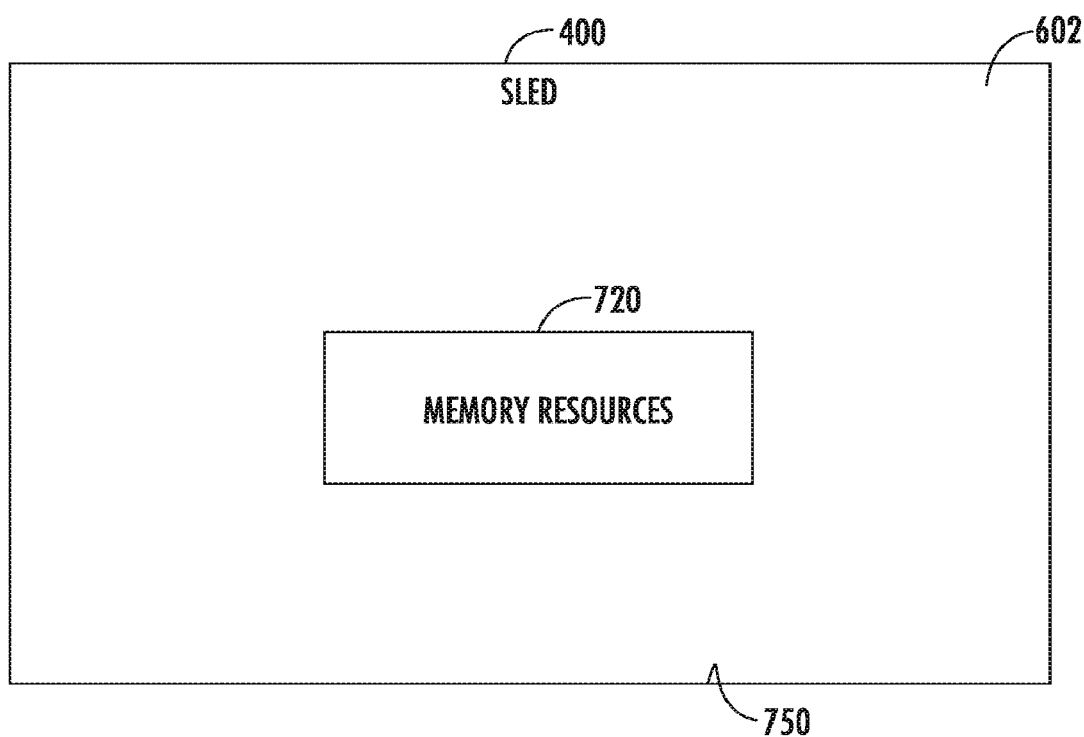
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory devices 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
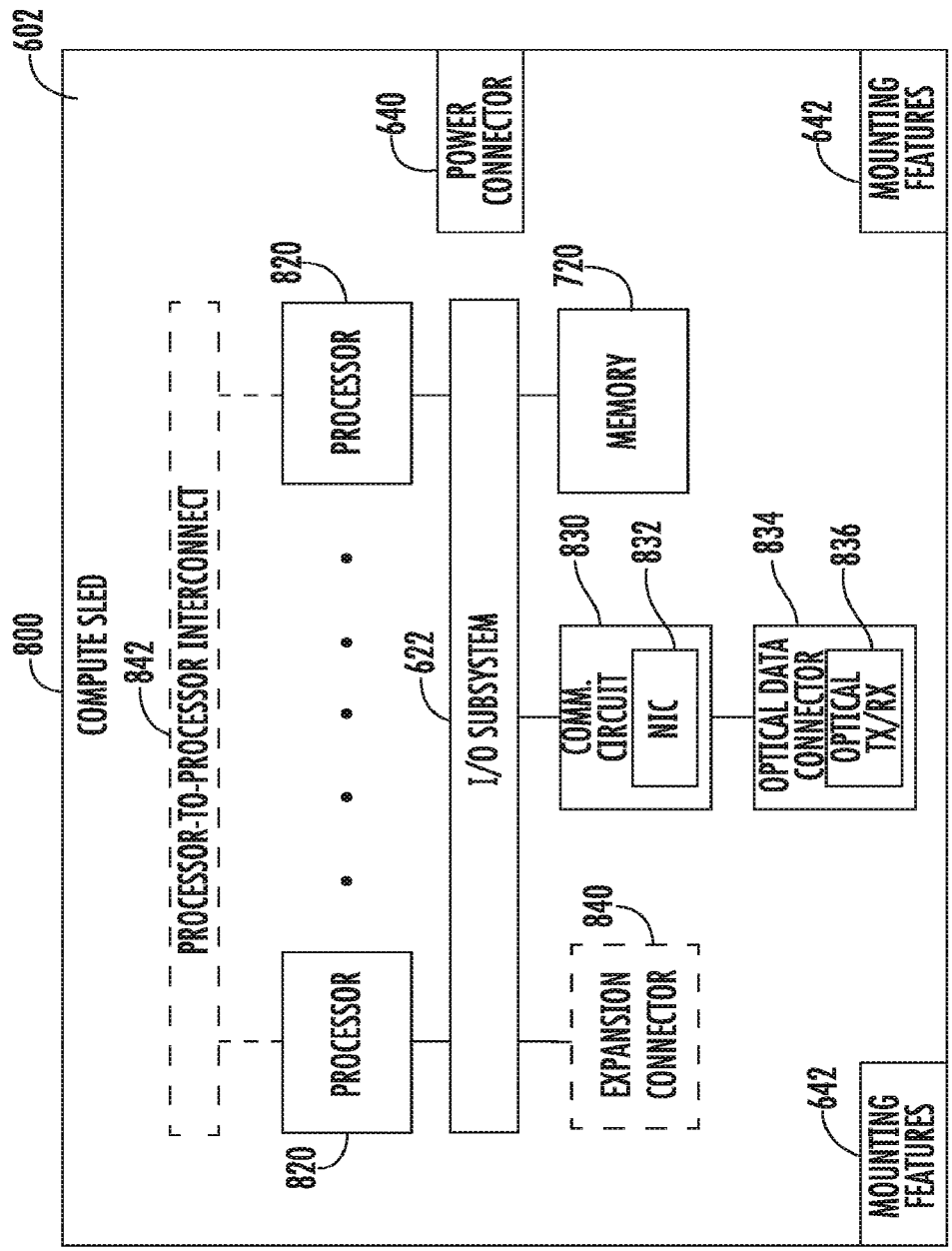
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
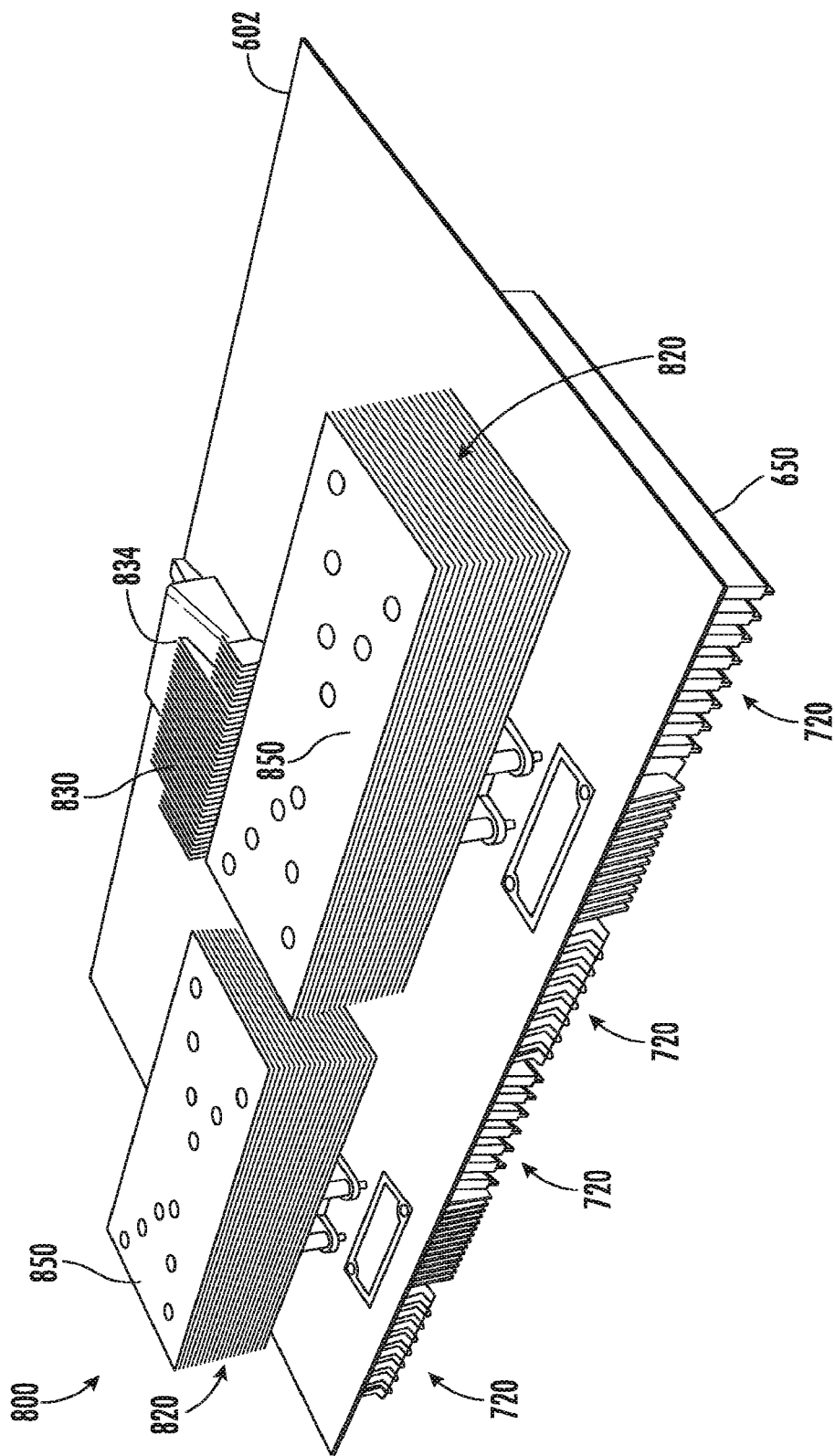
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsinks.

Figure 10:
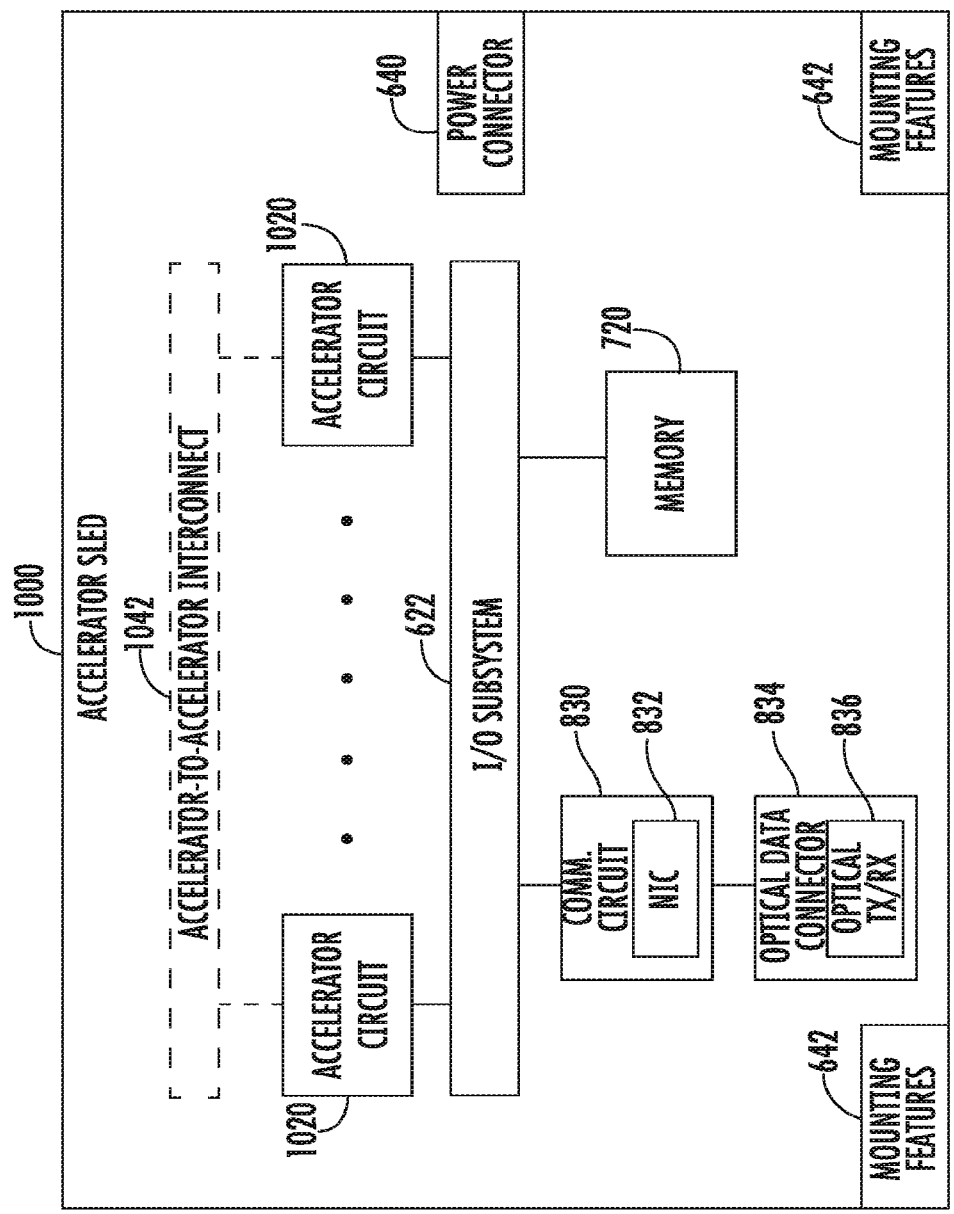
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is optimized, or otherwise configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

In the illustrative accelerator sled 1000, the physical resources 620 are embodied as accelerator circuits 1020.

Figure 11:
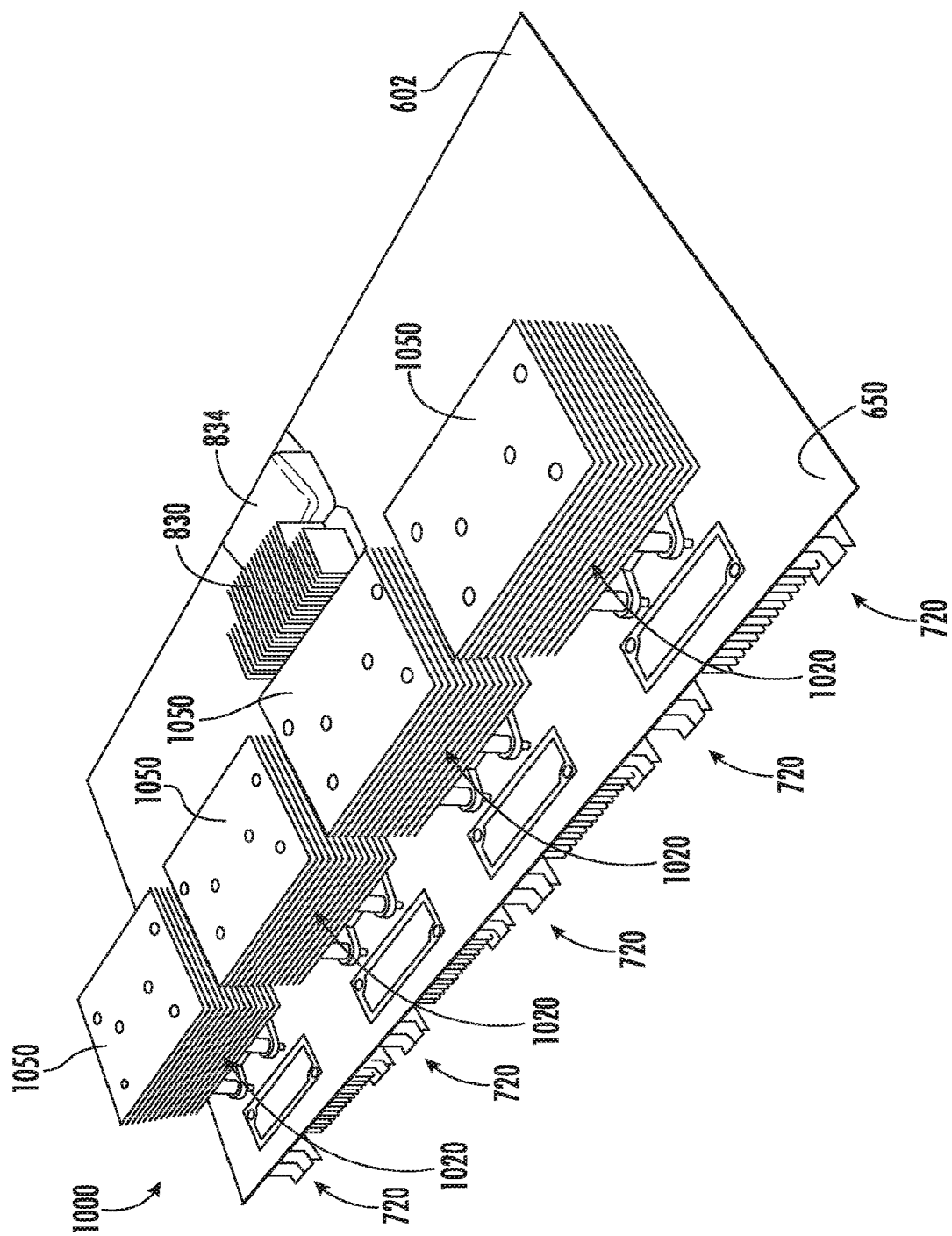
FIG. 11 is a top perspective view of at least one embodiment of the accelerator sled of FIG. 10.

Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than tradition heatsinks because of the "free" area provided by the memory devices 750 being located on the bottom side 750 of the chassis-less circuit board substrate 602 rather than on the top side 650.

Figure 12:
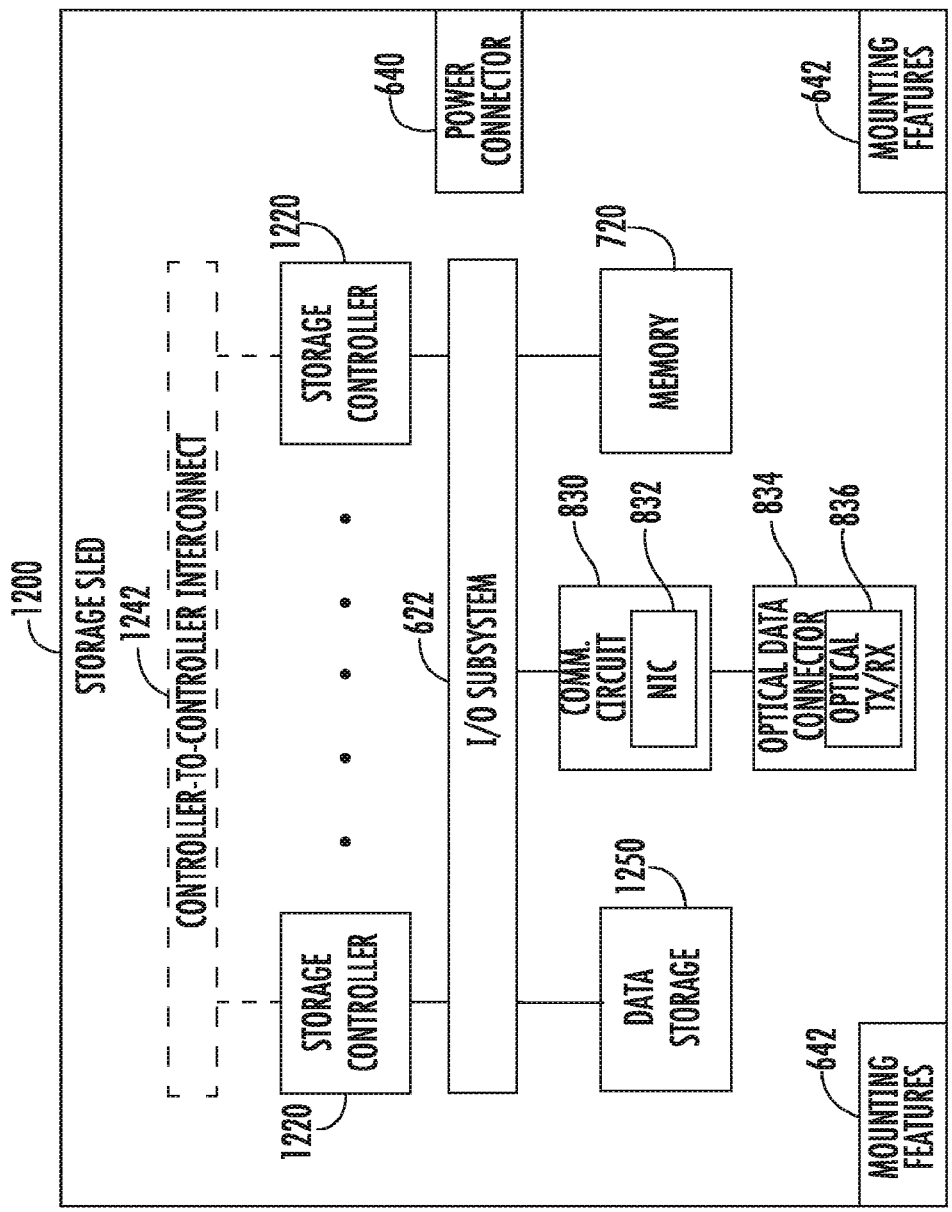
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is optimized, or otherwise configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
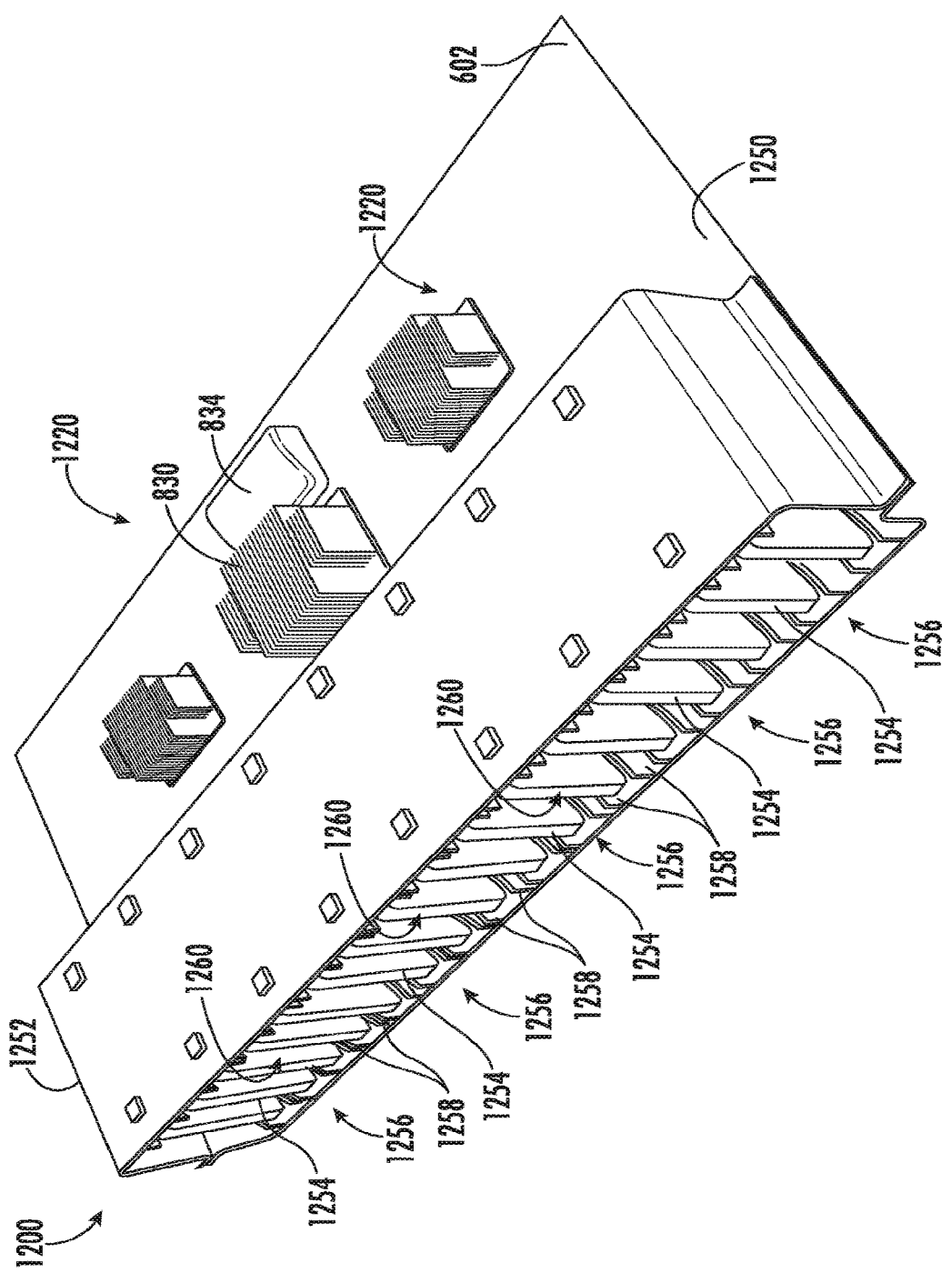
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
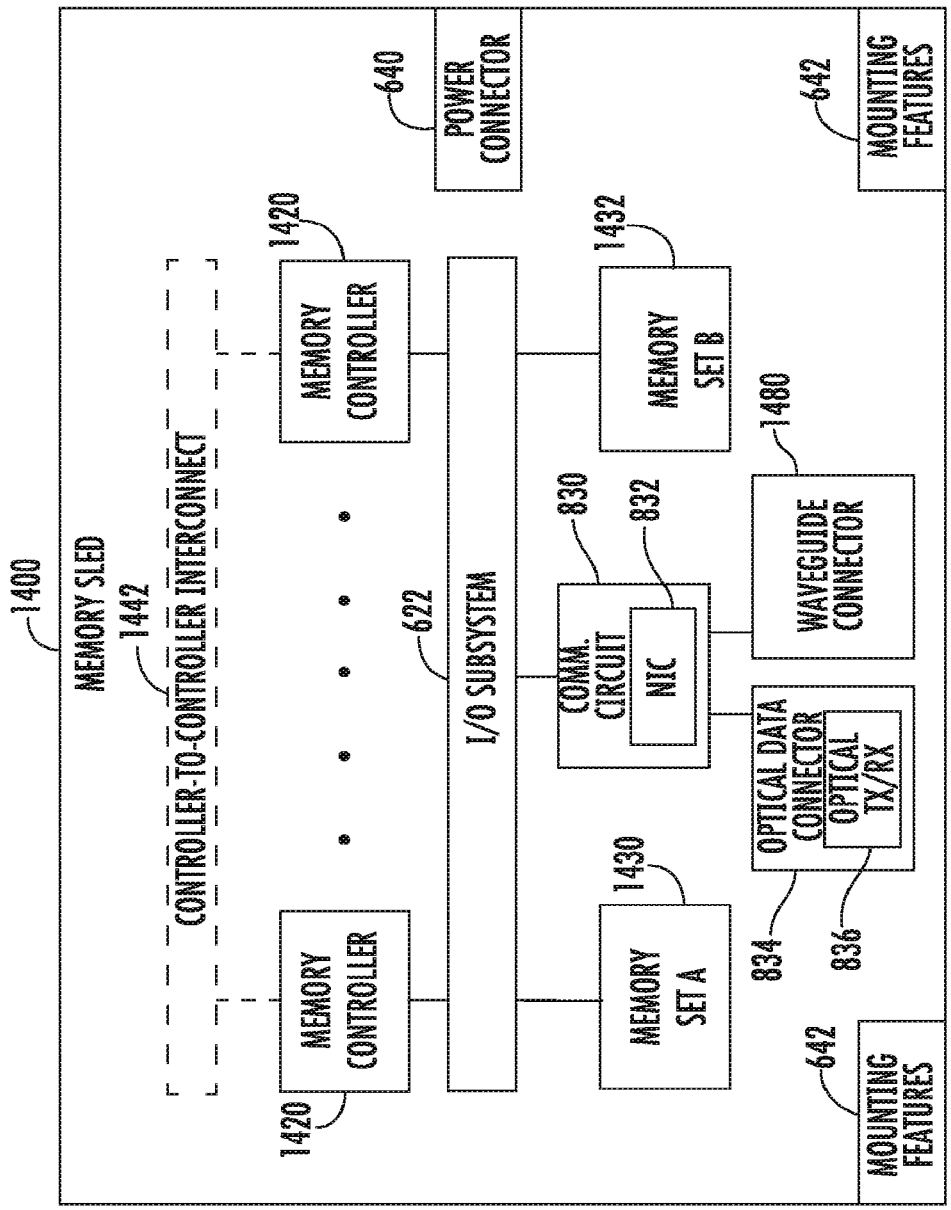
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each storage controller 1220 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Rt (i.e., transmit) lanes. Each lane, in the illustrative embodiment, is either 16 Ghz or 32 Ghz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
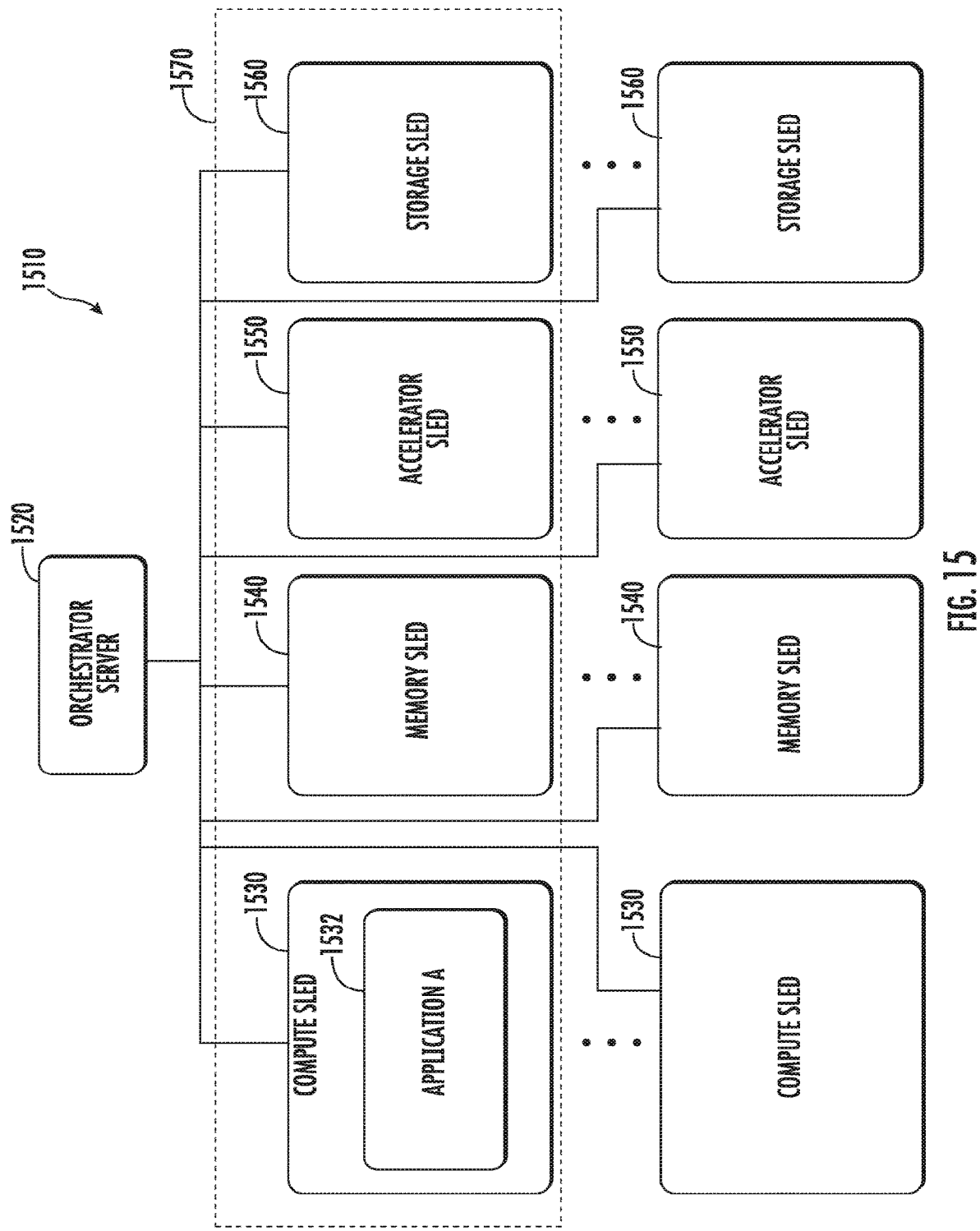
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. If the so, the orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
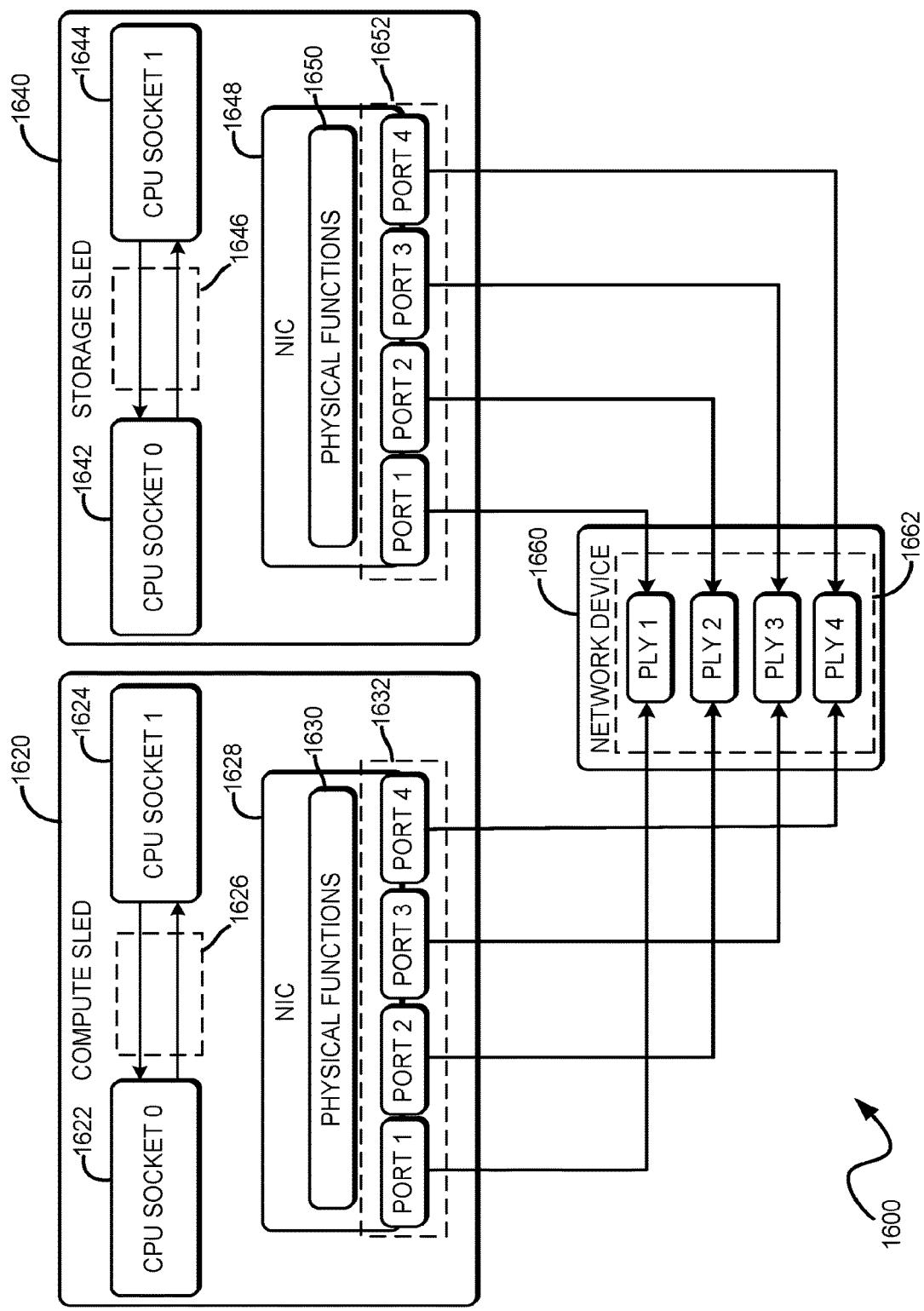
FIG. 16 is a simplified block diagram of a four-ply switch network that may be included in the data center of FIG. 1.

Referring now to FIG. 16, an example four-ply switched network 1600 is shown. In the network 1600, default mechanisms for load balancing may be used. In this example, a compute sled 1620 and storage sled 1640 are interconnected via a network device 1660. The compute sled 1620 and storage sled 1640 may be representative of the compute sleds and storage sleds discussed relative to the previous figures. In some embodiments, the network device 1660 is representative of a 4-ply switch. The network device 1660 includes plies 1662, enumerated as 1, 2, 3, and 4.

Illustratively, the compute sled 1622 provides a CPU socket 0 1622 and CPU socket 1 1624. Each of the CPU socket 0 1622 and the CPU socket 1 1624 may be in a non-uniform memory access (NUMA) mode. In NUMA mode, the CPU socket 0 1622 and CPU socket 1 1624 each are associated with a distinct portion of memory of the compute sled. The CPU socket 0 1622 and CPU socket 1 1624 may communicate with one another (e.g., transfer data) via a point-to-point processor interconnect 1626. Further, the compute sled 1622 includes a network interface controller (NIC) 1628 that provides one or more physical functions 1630. Each of the physical functions 1630 are embodied as PCI functions that provide a given functionality of the NIC 1628 in a virtualization usage (e.g., a virtual function may be associated with resources of a given physical function 1630). Further still, the NIC 1628 provides ports 1632, enumerated as 1, 2, 3, and 4. The CPU socket 0 1622 and CPU socket 1 1624 are mapped to particular ports 1632, which in turn are connected to a particular switch ply 1662.

Network traffic (e.g., storage I/O traffic) may be load balanced over the switch plies 1662. The CPU socket 0 1622 and CPU socket 1 1624 are mapped to one or more physical functions 1630.

The storage sled 1640 includes similar components as the compute sled 1622. For instance, the storage sled 1640 includes a CPU socket 1642 and a CPU socket 1 1644, which are like the CPU socket 0 1622 and CPU socket 1 1624. The CPU socket 0 1642 and CPU socket 1 1644 may communicate with one another via a point-to-point processor interconnect 1646. The storage sled 1640 includes a NIC 1648 having physical functions 1650, which are like the NIC 1628 and physical functions 1630. The NIC 1648 has ports 1652, which are like the ports 1632. In this example case, the storage sled 1640 provides a storage service that may be accessed by the compute sled 1622. For example, the CPU socket 0 1642 and CPU socket 1 1644 may provide a given storage service. Each storage service listens for network traffic on the ports 1652. Each port 1652 receives traffic destined for a specified IP address. In addition to storage traffic flowing between the compute sled 1622 and the storage sled 1640, the network device 1660 may concurrently process other kinds of sled traffic (e.g., tenant virtual machine traffic, container traffic, and the like).

In operation, the network 1600 may experience link failure at a given ply 1662. For instance, assume ply 2 of the network device 1660 fails. As a result, uplink traffic from the ply 2 (intended for port 2 of the NIC 1648) may need to arrive to a different port of the NIC 1648, such as port 1. However, one concern in doing so is that if the port is currently mapped with a given CPU socket (e.g., CPU socket 0 1642), the additional traffic arriving at that port is destined for a physical function 1650 associated with the other CPU socket (e.g., CPU socket 1 1644). In such a case, the CPU socket 0 1642 might relay the traffic flow to the CPU socket 1 1644 via the processor interconnect 1646. However, doing so results in increased latency for the traffic flow. Therefore, traffic inside the storage sled 1640 should be routed to the proper physical function 1650 and IP address and port during normal and ply failure conditions without crossover at the processor interconnect 1646.

As further described herein, the present disclosure provides techniques for load balancing traffic flows for scenarios in which traffic from a failed ply (or switch) is caused to arrive from a given NIC port associated with a given CPU socket to another NIC port associated with another CPU socket, e.g., in a NUMA mode. In particular, techniques provide a software defined networking (SDN) approach that provides a controller and agent-based control plane system over an L3 network layer. In doing so, techniques also provide a circular distributed hashing table (DHT)-based hierarchical control message representing and routing to determine a path hierarchy for adjusting load balancing of traffic flows. Further still, techniques use a flattened virtual Ethernet bridge (VEB) mode in the NIC to control traffic flows. Doing so provides a single-switching domain (e.g., as opposed to multiple switching domains), which advantageously allows for a flexible forwarding capability and results in efficient load balancing.

Figure 17:
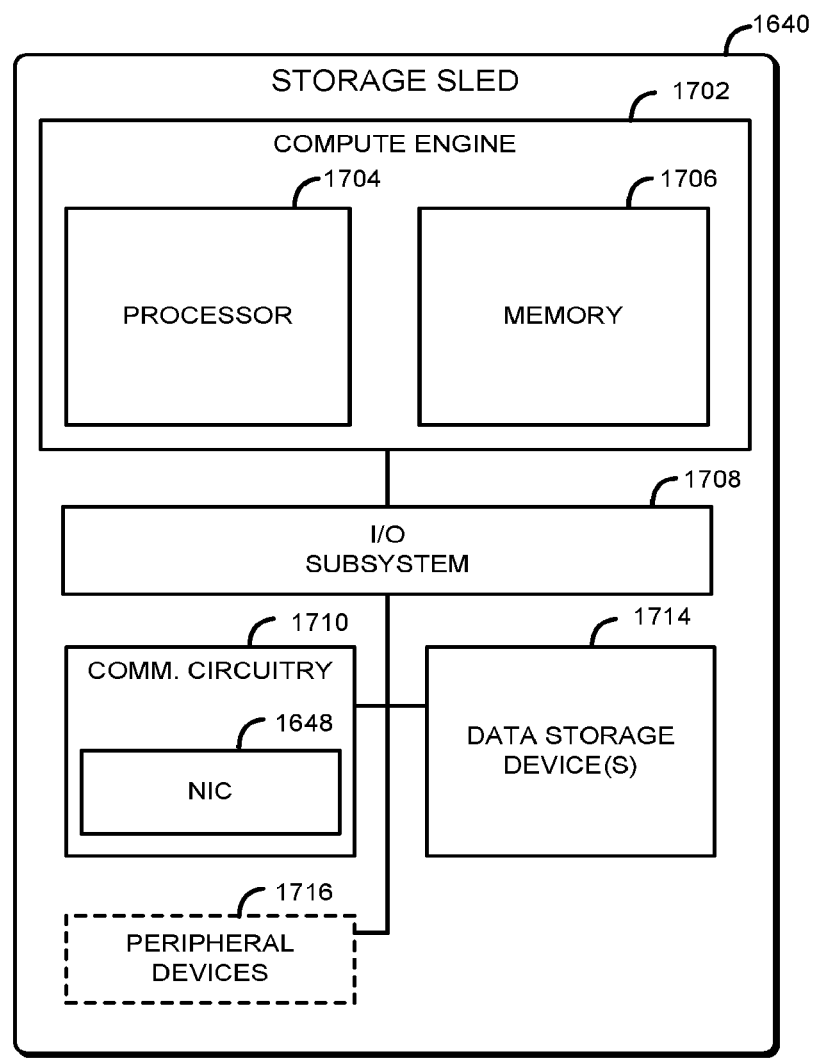
FIG. 17 is a simplified block diagram of at least one embodiment of the storage sled of FIG. 16.

Referring now to FIG. 17, the storage sled 1640 may be embodied as any type of computing system capable of performing the functions described herein, including determining that a link failure between a NIC port and a switch ply has occurred, determining (e.g., using a DHT indicative of a hierarchy of connections from the switch to the ports) a load balancing path for the NIC port, and remapping the first port based on the determined load balancing path. Note, while FIG. 17 depicts hardware components of the storage sled 1640, one of skill in the art will recognize that the compute sled 1620 of FIG. 16 can include similar components.

As shown in FIG. 17, the illustrative storage sled 1640 includes a compute engine 1702, an input/output (I/O) subsystem 1708, communication circuitry 1710, and one or more data storage devices 1714. Of course, in other embodiments, the storage sled 1640 may include other or additional components, such as those commonly found in a computer (e.g., display, peripheral devices, etc.), such as peripheral devices 1716. Additionally, in some embodiments, one or more of the illustrative components may be incorporated in, or otherwise form a portion of, another component.

The compute engine 1702 may be embodied as any type of device or collection of devices capable of performing various compute functions described below. In some embodiments, the compute engine 1702 may be embodied as a single device such as an integrated circuit, an embedded system, a FPGA, a system-on-a-chip (SOC), or other integrated system or device. Additionally, in some embodiments, the compute engine 1702 includes or is embodied as a processor 1704 and a memory 1706. The processor 1704 may be embodied as one or more processors, each processor being a type capable of performing the functions described herein. For example, the processor 1704 may be embodied as a single or multi-core processor(s), a microcontroller, or other processor or processing/controlling circuit. In some embodiments, the processor 1704 may be embodied as, include, or be coupled to an FPGA, an ASIC, reconfigurable hardware or hardware circuitry, or other specialized hardware to facilitate performance of the functions described herein. In some embodiments, the processor 1704 includes the CPU sockets 1642 and 1644.

The memory 1706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1706 may be integrated into the processor 1704.

The compute engine 1702 is communicatively coupled with other components of the storage sled 1640 via the I/O subsystem 1708, which may be embodied as circuitry and/or components to facilitate input/output operations with the compute engine 1702 (e.g., with the processor 1704 and/or the memory 1706), as well as other sleds (e.g., the compute sled 1620), if applicable. For example, the I/O subsystem 1708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1708 may form a portion of a system-on-a-chip (SoC) and be incorporated, along with one or more of the processor 1704, the memory 1706, and other components of the storage sled 1640, into the compute engine 1702.

The communication circuitry 1710 may be embodied as any communication circuit, device, or collection thereof, capable of enabling communications over the network between the storage sled 1640 and another system (e.g., the compute sled 1620, etc.). The communication circuitry 1710 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1710 includes a network interface controller (NIC) 1648, which may also be referred to as a host fabric interface (HFI). The NIC 1648 may be embodied as one or more add-in-boards, daughter cards, network interface cards, controller chips, chipsets, or other devices that may be used by the storage sled 1640 to connect with another compute device. In some embodiments, the NIC 1648 may be embodied as part of a system-on-a-chip (SoC) that includes one or more processors, or included on a multichip package that also contains one or more processors. In some embodiments, the NIC 1648 may include a local processor (not shown) and/or a local memory (not shown) that are both local to the NIC 1648. In such embodiments, the local processor of the NIC 1648 may be capable of performing one or more of the functions of the compute engine 1702 described herein. Additionally or alternatively, in such embodiments, the local memory of the NIC 1648 may be integrated into one or more components of the storage sled 1640 at the board level, socket level, chip level, and/or other levels.

The one or more illustrative data storage devices 1714, may be embodied as any type of devices configured for short-term or long-term storage of data such as, for example, memory devices and circuits, memory cards, hard disk drives (HDDs), solid-state drives (SSDs), or other data storage devices. Each data storage device 1714 may include a system partition that stores data and firmware code for the data storage device 1714. Each data storage device 1714 may also include an operating system partition that stores data files and executables for an operating system.

Additionally or alternatively, the storage sled 1640 may include one or more peripheral devices 1716. Such peripheral devices 1716 may include any type of peripheral device commonly found in a compute device such as a display, speakers, a mouse, a keyboard, and/or other input/output devices, interface devices, and/or other peripheral devices.

Figure 18:
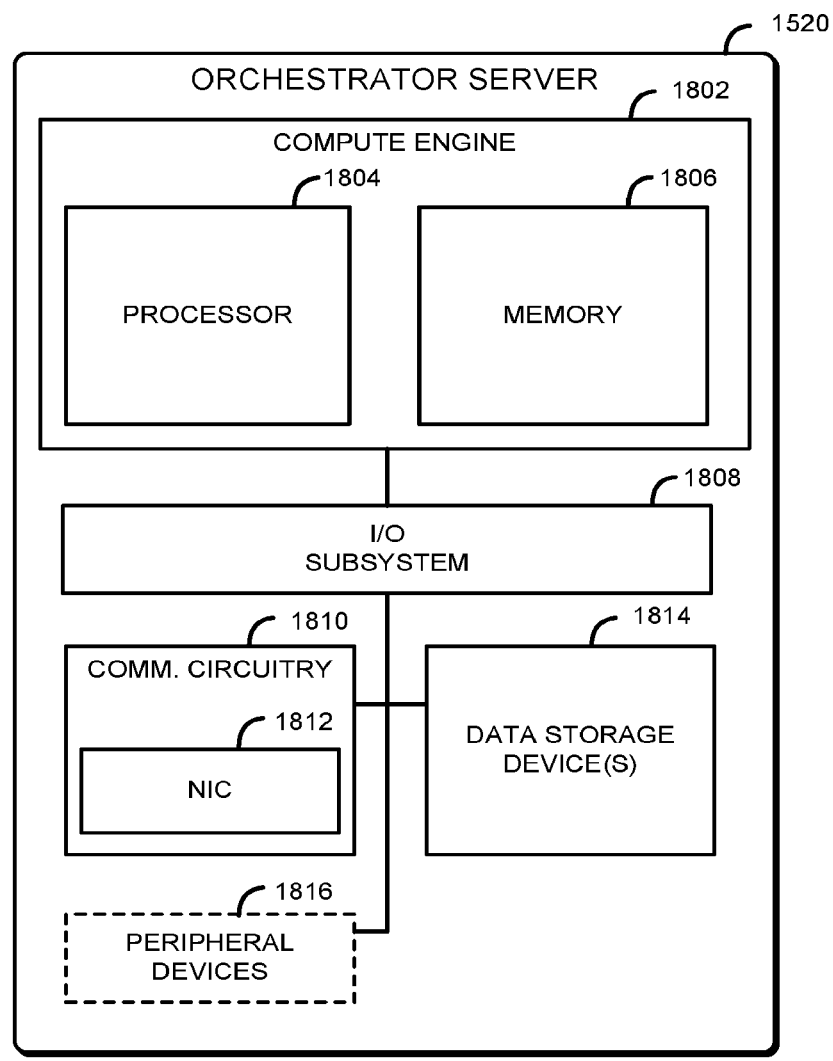
FIG. 18 is a simplified block diagram of at least one embodiment of the orchestrator server of FIG. 15.

Referring now to FIG. 18, the orchestrator server 1520 may be embodied as any type of system capable of performing the functions described herein. As shown in FIG. 18, the illustrative orchestrator server 1520 includes a compute engine 1802, an input/output (I/O) subsystem 1808, communication circuitry 1810, and one or more data storage devices 1814. Of course, in other embodiments, the orchestrator server 1520 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1802 may be embodied as any type of device or collection of devices capable of performing various compute functions described below, and is similar to the compute engine 1702 of FIG. 17. The processor 1804 may be embodied as one or more processors, and is similar to the processor 1704 described relative to FIG. 17. The memory 1806 may be embodied as any type of volatile (e.g., DRAM, etc.) or non-volatile memory or data storage capable of performing the functions described herein. In operation, the memory 1806 may store various software and data used during operation. The I/O subsystem 1808 is similar to the I/O subsystem 1708 described with reference to FIG. 17. The communication circuitry 1810, which, in the illustrative embodiment, includes a NIC 1812, is similar to the communication circuitry 1710 and NIC 1648 described with reference to FIG. 17. Additionally, the data storage devices 1814 are similar to the data storage devices 1714 described with reference to FIG. 17. Further, the peripheral devices 1816 are similar to the peripheral devices 1716, described with reference to FIG. 17.

The compute sled 1620 may have components similar to those described in FIGS. 17 and 18. Further, it should be appreciated that any of the sleds 1620, 1640, and the orchestrator server 1520 may include other components, sub-components, and devices commonly found in a computing device, which are not discussed above in reference to the storage sled 1640 and the orchestrator server 1520 and not discussed herein for clarity of the description.

As described above, the orchestrator server 1520 and the sleds 1620 and 1640 are illustratively in communication via a network, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 19:
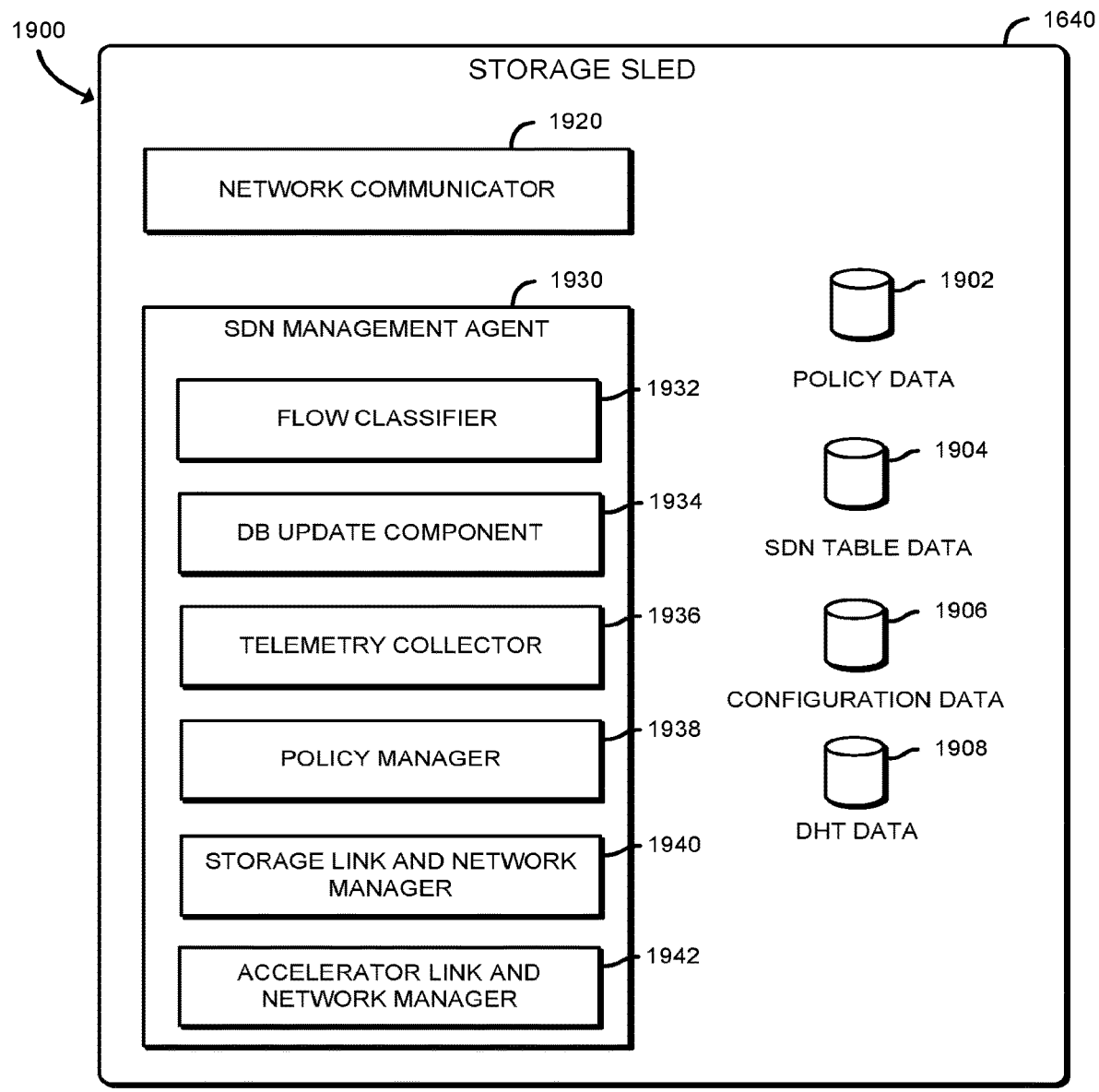
FIG. 19 is a simplified block diagram of at least one embodiment of an environment that may be established by the storage sled of FIG. 16.

Referring now to FIG. 19, the storage sled 1640 may establish an environment 1900 during operation. The illustrative environment 1900 includes a network communicator 1920 and software defined networking (SDN) management agent 1930. Each of the components of the environment 1900 may be embodied as hardware, firmware, software, or a combination thereof. As such, in some embodiments, one or more of the components of the environment 1900 may be embodied as circuitry or a collection of electrical devices (e.g., network communicator circuitry 1920, SDN management agent circuitry 1930, etc.). It should be appreciated that, in such embodiments, one or more of the network communicator circuitry 1920 or SDN management agent circuitry 1930 may form a portion of one or more of the compute engine 1702, the communication circuitry 1710, the I/O subsystem 1708 and/or other components of the storage sled 1640. In the illustrative embodiment, the environment 1900 includes policy data 1902, which may be embodied as any data indicative of policies relating to flow and port mappings. The policy data 1902 may also include quality of service (QoS) requirements for a given network or storage traffic flow, such as latency requirements, bandwidth requirements, and the like. In addition, the policy data 1902 also includes load balancing policies describing how physical functions should be associated with ports in the NIC 1648. The policy data 1902 may also indicate one or more thresholds (e.g., of latency) for determining a given link as congested. The environment 1900 also includes SDN table data 1904, which may be embodied as any data indicative of network forwarding tables modifiable by components such as the SDN management agent 1930. For instance, the SDN table data 1904 may include Openflow and Virtual Extensible LAN (VXLAN) tables. Further, the environment 1900 includes configuration data 1906, which may be embodied as any data indicative of VXLAN configurations for compute and storage services on the storage sled 1640. For example, the configuration data 1906 may specify that a virtual network instance provides storage services, such as replication and storage volume access in the storage sled 1640. The configuration data 1906 may also specify tenant traffic between the compute sled 1620 and the storage sled 1640 at another virtual network instance. Further still, the environment 1900 includes distributed hashing table (DHT) data 1908, which may be embodied as any data indicative of a hierarchy of connections from the network device 1660 to the CPU sockets 1642 and 1644. The DHT data is used to search for a path for load balancing once a link fails or congestion increases, subject to policy data 1902. Note, the compute sled 1620 and other sleds may also establish an environment similar to that of environment 1900.

In the illustrative environment 1900, the network communicator 1920, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the storage sled 1640, respectively. To do so, the network communicator 1920 is configured to receive and process data packets from one system or computing device (e.g., the compute sled 1620, the orchestrator server 1520, etc.) and to prepare and send data packets to a computing device or system (e.g., the compute sled 1620, the orchestrator server 1520, etc.). Accordingly, in some embodiments, at least a portion of the functionality of the network communicator 1920 may be performed by the communication circuitry 1710, and, in the illustrative embodiment, by the NIC 1712.

The SDN management agent 1930, which may be embodied as hardware, firmware, software, virtualized hardware, emulated architecture, and/or a combination thereof, is in communication with an SDN management controller executing on a host or the orchestrator server 1520. The SDN management agent 1930 is used to program a policy-based flow and port mappings, which in turn work with firmware in the NIC 1648. The SDN management agent 1930 is to determine whether a link failure has occurred between a switch ply and a NIC port (e.g., based on an evaluation of collected telemetry data relative to the policy data 1902), determine (e.g., using the DHT data 1908) a load balancing path for the NIC port, and remap the port based on the determined path. To do so, the SDN management agent 1930 includes a flow classifier 1932, a database (DB) update component 1934, a telemetry collector 1936, a policy manager 1938, a storage link and network manager 1940, and an accelerator link and network manager 1942.

In the illustrative embodiment, the flow classifier 1932 is configured to evaluate features of network flow data and classify the traffic flow based on the evaluation. In some cases, the policy manager 1938 may use the classifications in determining load balancing flows following link failure between a NIC port and a switch ply. The DB update component 1934 is to perform in-memory updates on the SDN table data 1904. The DB update component 1934 may program the network traffic flow and port mappings based on policy data 1902. For example, the DB update component 1934 may do so in response to a request from the policy manager 1938.

In the illustrative embodiment, the telemetry collector 1936 is to monitor network flows and connections between ports 1652 of the NIC 1648 and the plies 1662. The telemetry collector 1936 is also to receive notifications on telemetry data such as latency, congestion, and link failures and provide the information to management software (e.g., executing on a host device) or an SDN management controller (e.g., executing on the orchestrator server 1520). The policy manager 1938 is to determine which of the policy data 1902 is to be applied in programming the SDN table data 1904. For example, the policy manager 1938 may identify a load balancing policy based on QoS requirements and congestion data in response to the SDN management agent 1930 detecting that a link failure or congestion has occurred between a specified NIC port and a switch ply. The policy manager 1938 is also to determine (e.g., based on DHT data 1908) a path hierarchy for a load balancing path after the link failure.

In the illustrative embodiment, the storage link and network manager 1940 and the accelerator link and network manager 1942 are to monitor a status of storage connections and accelerator device link connections, respectively. For example, the storage link and network manager 1940 may maintain information regarding the mappings of physical functions to a given NIC port. The storage link and network manager 1940 and accelerator link and network manager 1942 may receive notifications from the SDN controller and report respective status information of storage link connections and accelerator link connections.

It should be appreciated that each component of the SDN management agent 1930 may be separately embodied as hardware, firmware, software, virtualized hardware, emulated architecture, and/or a combination thereof. For example, the flow classifier 1932 and the telemetry collector 1936 may be embodied as hardware components, while the policy manager 1938 is embodied as virtualized hardware components or as some other combination of hardware, firmware, software, virtualized hardware, emulated architecture, and/or a combination thereof.

Figure 20:
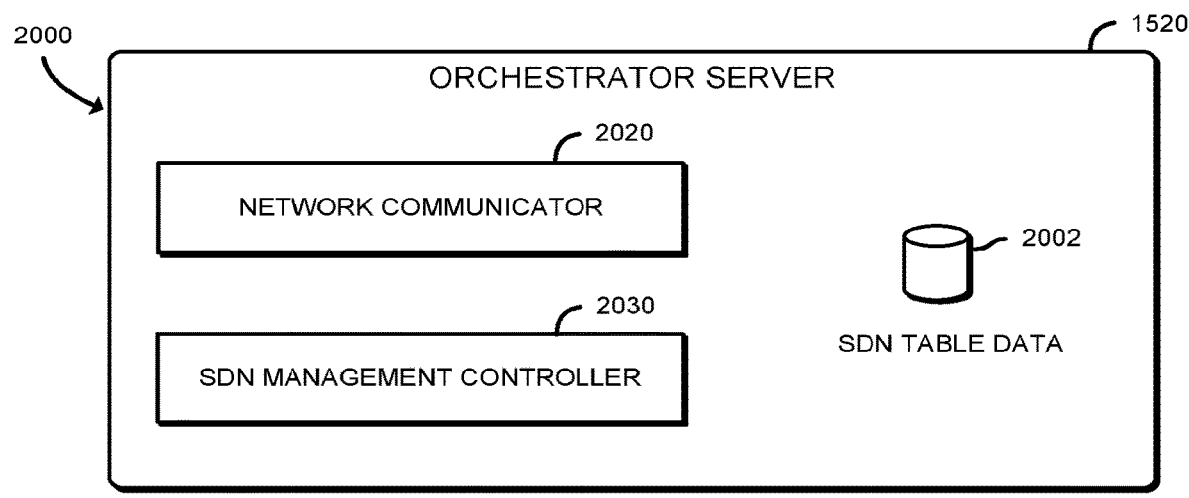
FIG. 20 is a simplified block diagram of at least one embodiment of an environment that may be established by the orchestrator server of FIG. 20.

Referring now to FIG. 20, the orchestrator server 1520 may establish an environment 2000 during operation. The illustrative environment 2000 includes a network communicator 2020 and a SDN management controller 2030. Each of the components of the environment 2000 may be embodied as hardware, firmware, software, or a combination thereof. As such, in some embodiments, one or more of the components of the environment 2000 may be embodied as circuitry or a collection of electrical devices (e.g., network communicator circuitry 2020, SDN management controller circuitry 2030, etc.). It should be appreciated that, in such embodiments, one or more of the network communicator circuitry 2020 or SDN management controller circuitry 2030 may form a portion of one or more of the compute engine 1802, the communication circuitry 1810, the I/O subsystem 1808 and/or other components of the orchestrator server 1520. In the illustrative embodiment, the environment 2000 also includes SDN table data 2002, which may be embodied as any data indicative of a global network forwarding table including forwarding data associated with each sleds in the network, such as the compute sled 1620 and the storage sled 1640.

In the illustrative embodiment, the network communicator 2020, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1520, respectively. The network communicator 2020 is a similar component to the network communicator 1920 established by the storage sled 1640.

In the illustrative embodiment, the SDN management controller 2030 is to manage ply switch communication to sled ports and communicate with an SDN management agent executing on each sled. The SDN management controller 2030 may be of a two-level federated controller in which a controller executes at the pod level (e.g., on the orchestrator server 1520) and the other on a spine network device. The SDN management controller 2030 may receive NIC flow information from each sled via an agent executing thereon (e.g., the SDN management agent 1930). The SDN management controller 2030 is also to receive telemetry data reported from each agent. Further, the SDN management controller 2030 is to program forwarding rules for packet flows from a physical function to any uplink connection based on load balancing algorithms. For instance, the SDN management controller 2030 may direct the SDN management agents executing on sleds to propagate changes to a local SDN table indicative of updated forwarding rules.

Figure 21:
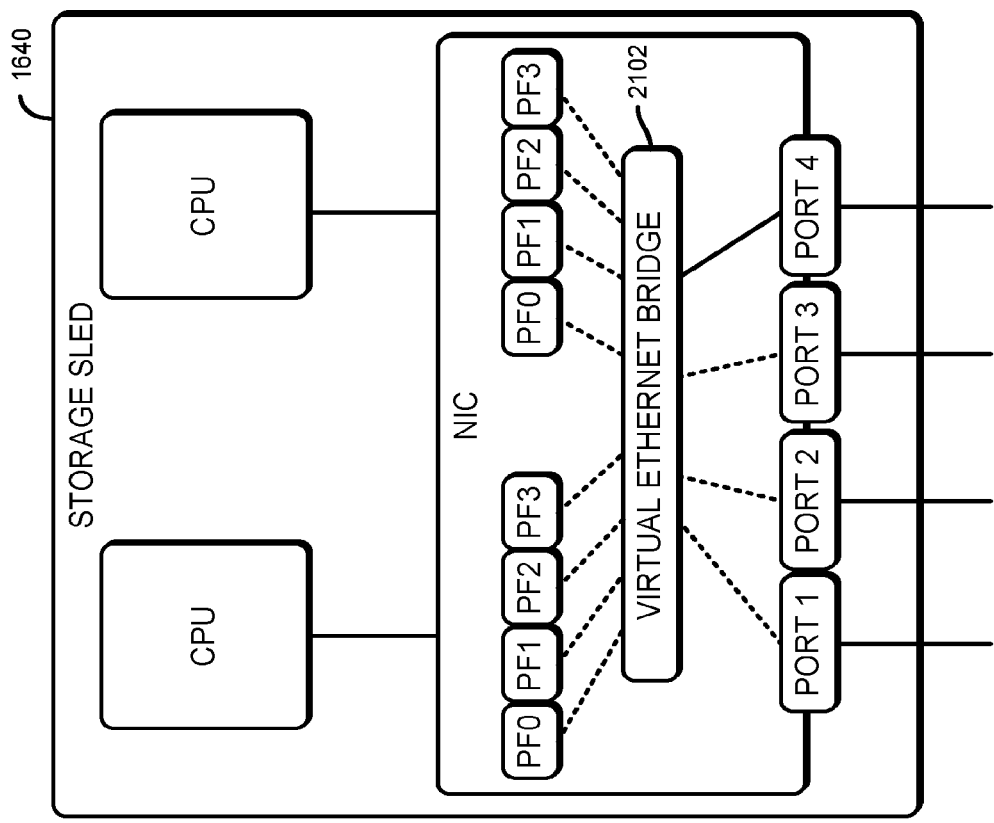
FIG. 21 is a simplified block diagram of at least one embodiment of a flattened virtual Ethernet bridge (VEB) used to provide forwarding capability inside a network interface controller (NIC) of the storage sled of FIG. 16.

Referring now to FIG. 21, a diagram of the storage sled 1640 as configured with a flattened virtual Ethernet bridge (VEB) 2102 is shown. Known approaches to using a VEB include associating a distinct VEB with each uplink port of the NIC 1648. Using a single, flattened VEB (e.g., VEB 2102) provides a single switching domain in the NIC 1648. Doing so provides flexible forwarding and routing capability for determining load balancing following failure of one of the switch plies in the network device 1660. Further, using a flattened VEB 2102 in the storage sled 1640 allows the SDN management controller to be controlled to program forwarding rules to deliver a packet flow from any uplink to any physical function, which is desirable for full load balancing of incoming traffic from the network device 1660. Likewise, for a transmission path, the SDN management controller can program forwarding rules for any packet flow from any physical function to any uplink for load balancing.

In some embodiments, the SDN management controller (e.g., executing in the orchestrator server 1520) and the SDN management agents (e.g., executing in the compute sled 1620 and storage sled 1640) may communicate control data with one another using a DHT. Using a DHT may involve a hash table key, a broadcast packet protocol data unit (PDU) structure, and a search algorithm to establish the communication between the SDN management controller and agents. Referring now to FIG. 22, an example of a PDU 2200 that may be communicated between controller and agent (e.g., via a SDN broadcast message) is shown. Illustratively, the PDU 2200 includes a variety of fields, such as a type, number of properties, CPU socket information, NIC physical function, port, switch port, ply identifier, switch identifier, spine switch identifier, power status, quality of service, level congestion, and data packet. Other fields may be included. The SDN management controller or agent may communicate such information to one another using the PDU. For example, the SDN management agent may encode congestion information in the appropriate field of the PDU and broadcast the data. The SDN management controller may obtain the broadcast message and further process the message.

Referring now to FIG. 23, an example DHT 2300 indicative of a loopy network where successor nodes are linked based on a policy (e.g., policy data 1902) is shown. The hash table is keyed by a given mapping hierarchy, such as:
CPU→NIC→Physical Function→NIC Port→Switch Ply Port→Ply Line Card→Switch ID
Further, the routing information that exists in the DHT 1800 is used for group communication (e.g., using the PDU 2200) among the sleds, orchestrator server 1520, and hosts.

Illustratively, the DHT 2300 constructs a ring by assigning an identifier to each node (e.g., sleds, hosts, etc.) and cause nodes to point to one another, which results in a sorted linked list. The head and tail of the list point to one another. As a result, the SDN management controller and agents can broadcast messages to all nodes in a ring-based overlay network in an efficient manner (e.g., in $O(\log n)$ time, using n overlay messages, where n is the number of nodes in the system). DHT-based group management can be implemented as a ring structure by applying an algorithm to recursively narrow the result to a given path.

In the DHT 2300, decreasing the number of hops is a performance factor. For example, for a given policy (e.g., "For all sleds, wire physical function 1 to software port 2 for n pods") that is to be set for load balancing from a global controller, the criteria is all servers with storage software running in NUMA mode. The storage sled 1640 may perform a recursive lookup to reduce the number of hops and provide policy application round-trip improvement. In doing so, the storage sled 1640 partitions the network into M spaces. The storage sled 1640 broadcasts a message used to discover all nodes with a specific "CPU socket in NUMA mode". While the message is being multicast recursively on 1 to M nodes, a second message "sw=storage SW ID" is multicast from M to n nodes. Doing so reduces server discovery by $O(n \log n/M)$.

Note, a DHT is used as a reference example for a data structure capable of identifying a path hierarchy. Of course, one in skill in the art will recognize that other data structures may be adapted, such as a tree- or trie-based data structure for search. As another example, hardware-based structures such as ternary content addressable memory can be adapted to the techniques described herein.

Figure 24:
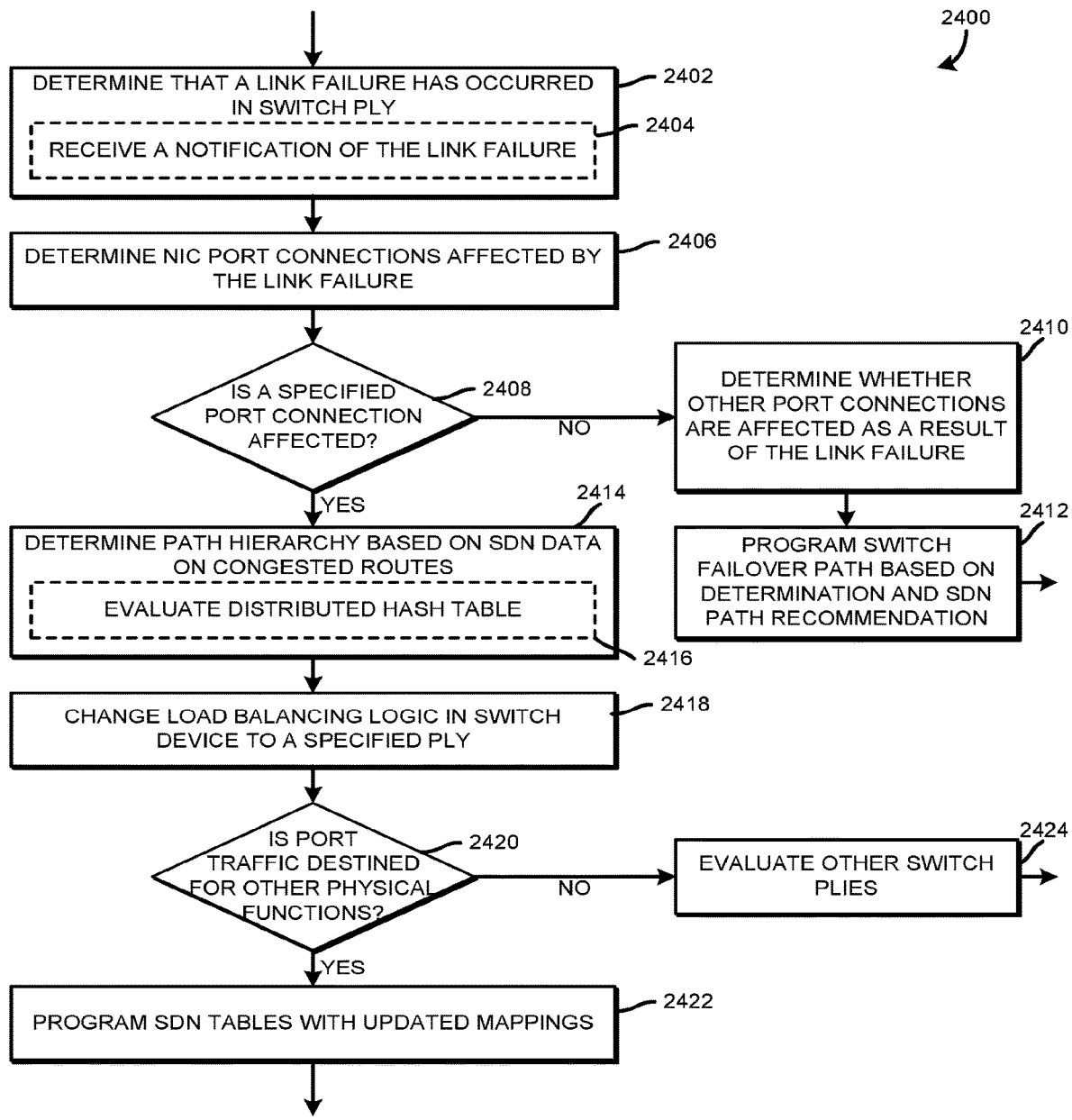
FIG. 24 is a simplified flow diagram of a SDN-based method to control a network flow after a link failure.

Referring now to FIG. 24, a sled (e.g., the storage sled 1640), in operation, may perform a method 2400 for controlling a network flow after a link failure. In this example, assume that an administrator has previously programmed SDN tables for tenant and storage services, with a port mapping of a virtual network instance (VNI) 1 traffic to a destination media access control (MAC) of port 1 as the VNI 3 and 4 for port 3 and 4. VNI 2 corresponds to tenant traffic between the storage sled 1640 and the compute sled 1620. The VXLAN is bridged and the network is used by virtual machines to access storage data for applications. VNI 3 corresponds to a storage replication service, and VNI 4 corresponds to a storage gateway service. If port 1 of the NIC 1648 is mapped to a physical function 1, and that in turn is assigned to a service on CPU socket 0 1642, the storage sled 1640 should ensure that traffic does not reach CPU socket 1 1644 (which would result in the CPU socket 1 1644 transferring the traffic over the processor interconnect 1646).

As shown, the method 2400 begins in block 2402, in which the storage sled 1640, via the SDN management agent, determines that a link failure has occurred for a connection between a port of the NIC 1648 and a switch (e.g., a ply in the switch) in the network device 1660. For example, a link failure may occur in the event that a switch ply goes offline or otherwise becomes inactive. Another example of link failure may occur in the event that the link is congested (e.g., a network latency or some congestion measure exceeds a specified threshold). In some cases, in block 2404, the storage sled 1640 receives (e.g., from the SDN management controller), a notification of the link failure. The notification may specify the switch ply and NIC ports affected by the failure.

In block 2406, the storage sled 1640 determines the connections that are affected by the link failure. More particularly, the storage sled 1640 determines whether which of the NIC ports is associated with the ply that has failed. In block 2408, the storage sled 1640 determines whether a specified port connection is affected. In this example, assume that the storage sled 1640 determines whether the connection between switch ply 2 and NIC port 2 is affected. If the specified port is not affected, then in block 2410, the storage sled 1640 determines whether other port connections are affected as a result of the link failure. In block 2412, the storage sled 1640 programs the SDN table with a switch failover path, given a path recommendation from the policy manager on the storage sled 1640.

Otherwise, if the specified port connection is affected, then in block 2414, the storage sled 1640 determines a path hierarchy based on SDN data on the congested routes. The storage sled 1640 does so to determine a network path that results in an efficient load balancing. Particularly, in block 2416, the storage sled 1640 evaluates the DHT to determine such a path. In block 2418, the storage sled 1640 changes load balancing logic in the network device 1660 to a specified ply. In particular, the storage sled 1640 may transmit the path information to the SDN management controller, which in turn configures the network device 1660 based on the information.

In block 2420, the storage sled 1640 determines whether traffic at the affected port is destined for other physical functions associated with other ports. Continuing the previous example, the storage sled 1640 may determine whether traffic between ply 3 and NIC port 3 are intended for physical functions 2 and 3 based on VNI 2 or VNI 3. If so, then at block 2422, the storage sled 1640 programs SDN tables with updated mappings. In this example, the storage sled 1640 programs the SDN table to specify the VNI 2 traffic destination as physical function 2. If not, then in block 2424, the storage sled 1640 evaluates plies 1, 2, or 4 to determine whether port 3 traffic is intended for physical functions 2 and 3, and programs the SDN table accordingly.

EXAMPLES

Illustrative examples of the technologies disclosed herein are provided below. An embodiment of the technologies may include any one or more, and any combination of, the examples described below.

Example 1 includes a sled comprising communication circuitry including a network interface controller (NIC) having a plurality of ports, wherein each port is connected with one of a plurality of switches of a network device and wherein each port is mapped to one or more physical functions; and a compute engine to determine that a link failure between a first one of the ports and a first one of the plurality of switches has occurred; determine, from a hierarchy of connections from the network device to the plurality of ports, a load balancing path for the first one of the ports; and remap the first port based on the determined load balancing path.

Example 2 includes the subject matter of Example 1, and wherein each port is mapped to the one or more physical functions via a flattened virtual Ethernet bridge (VEB).

Example 3 includes the subject matter of any of Examples 1 and 2, and wherein to remap the first port based on the determined load balancing path comprises to program, by the flattened VEB, one or more forwarding rules to deliver a packet flow from an uplink to the one or more physical functions.

Example 4 includes the subject matter of any of Examples 1-3, and wherein to determine that the link failure has occurred comprises to receive, from a management controller, a notification that the first one of the plurality of switches is inactive.

Example 5 includes the subject matter of any of Examples 1-4, and wherein to determine that the link failure has occurred comprises to receive, from a management controller, a notification that the first one of the plurality of switches is congested.

Example 6 includes the subject matter of any of Examples 1-5, and wherein to determine that the link failure has occurred comprises to determine, based on collected telemetry data, that a connection between the first one of the plurality of ports and the first one of the plurality of switches is congested.

Example 7 includes the subject matter of any of Examples 1-6, and wherein to remap the first port based on the determined load balancing path comprises to program a switch forwarding table on the network device to direct network traffic according to the load balancing path.

Example 8 includes the subject matter of any of Examples 1-7, and wherein the compute engine comprises at least a first processor socket and a second processor socket, and wherein the sled is in a non-uniform memory access (NUMA) mode, and wherein the first processor socket and second processor socket are mapped to one or more of the plurality of ports.

Example 9 includes the subject matter of any of Examples 1-8, and wherein to determine the load balancing path for the first one of the ports further comprises to determine, based on a load balancing policy and one or more quality of service requirements, the load balancing path.

Example 10 includes one or more machine-readable storage media storing a plurality of instructions, which, when executed, cause a sled to determine that a link failure between a first one of a plurality of ports of a network interface controller in the sled and a first one of a plurality of switches of a network device has occurred, wherein each port is connected with one of a plurality of switches of the network device and wherein each port is mapped to one or more physical functions; determine, from a hierarchy of connections from the network device to the plurality of ports, a load balancing path for the first one of the ports; and remap the first port based on the determined load balancing path.

Example 11 includes the subject matter of Example 10, and wherein each port is mapped to the one or more physical functions via a flattened virtual Ethernet bridge (VEB).

Example 12 includes the subject matter of any of Examples 10 and 11, and wherein to remap the first port based on the determined load balancing path comprises to program, by the flattened VEB, one or more forwarding rules to deliver a packet flow from an uplink to the one or more physical functions.

Example 13 includes the subject matter of any of Examples 10-12, and wherein to determine that the link failure has occurred comprises to receive, from a management controller, a notification that the first one of the plurality of switches is inactive.

Example 14 includes the subject matter of any of Examples 10-13, and wherein to determine that the link failure has occurred comprises to receive, from a management controller, a notification that the first one of the plurality of switches is congested.

Example 15 includes the subject matter of any of Examples 10-14, and wherein to determine that the link failure has occurred comprises to determine, based on collected telemetry data, that a connection between the first one of the plurality of ports and the first one of the plurality of switches is congested.

Example 16 includes the subject matter of any of Examples 10-15, and wherein to remap the first port based on the determined load balancing path comprises to program a switch forwarding table on the network device to direct network traffic according to the load balancing path.

Example 17 includes the subject matter of any of Examples 10-16, and wherein the compute engine comprises at least a first processor socket and a second processor socket, and wherein the sled is in a non-uniform memory access (NUMA) mode, and wherein the first processor socket and second processor socket are mapped to one or more of the plurality of ports.

Example 18 includes the subject matter of any of Examples 10-17, and wherein to determine the load balancing path for the first one of the ports further comprises to determine, based on a load balancing policy and one or more quality of service requirements, the load balancing path.

Example 19 includes a method, comprising determining, by a sled, that a link failure between a first one of a plurality of ports of a network interface controller in the sled and a first one of a plurality of switches of a network device has occurred, wherein each port is connected with one of a plurality of switches of the network device and wherein each port is mapped to one or more physical functions; determining, from a hierarchy of connections from the network device to the plurality of ports, a load balancing path for the first one of the ports; and remapping the first port based on the determined load balancing path.

Example 20 includes the subject matter of Example 19, and wherein each port is mapped to the one or more physical functions via a flattened virtual Ethernet bridge (VEB).

Example 21 includes the subject matter of any of Examples 19 and 20, and wherein remapping the first port based on the determined load balancing path comprises programming, by the flattened VEB, one or more forwarding rules to deliver a packet flow from an uplink to the one or more physical functions.

Example 22 includes the subject matter of any of Examples 19-21, and wherein determining that the link failure has occurred comprises receiving, from a management controller, a notification that the first one of the plurality of switches is inactive.

Example 23 includes the subject matter of any of Examples 19-22, and wherein determining that the link failure has occurred comprises receiving, from a management controller, a notification that the first one of the plurality of switches is congested.

Example 24 includes a sled, comprising means for determining that a link failure between a first one of a plurality of ports of a network interface controller in the sled and a first one of a plurality of switches of a network device has occurred, wherein each port is connected with one of a plurality of switches of the network device and wherein each port is mapped to one or more physical functions; means for determining, from a hierarchy of connections from the network device to the plurality of ports, a load balancing path for the first one of the ports; and circuitry for remapping the first port based on the determined load balancing path.

Example 25 includes the subject matter of Example 24, and wherein each port is mapped to the one or more physical functions via a flattened virtual Ethernet bridge (VEB).

The invention claimed is:

1. A network interface controller (NIC) comprising:
an interface and
circuitry to:
program, according to a policy, a software defined networking (SDN) table providing one or more network flow mappings to Peripheral Component Interconnect Express (PCIe) physical functions allocated to a plurality of central processing units (CPUs), wherein a first CPU of the plurality of CPUs and a second CPU of the plurality of CPUs are to access data from different portions of memory by non-uniform memory access (NUMA); and
direct an SDN management agent on at least one of the plurality of the CPUs to store the programmed SDN table to a local SDN table on the plurality of CPUs, wherein the local SDN table is to provide at least one port-to-physical function mapping.

2. The NIC of claim 1, wherein the circuitry is further to communicate control data to the SDN management agent on one of the plurality of CPUs.

3. The NIC of claim 2, wherein to communicate the control data to the SDN management agent comprises to communicate, via a distributed hash table (DHT), the control data to the SDN management agent.

4. The NIC of claim 3, wherein the circuitry is further to construct, via the DHT, a ring-based overlay network to enable at least one of the plurality of CPUs to communicate with another CPU.

5. The NIC of claim 4, wherein the DHT is to configure the NIC to transmit at least one of a CPU socket information, NIC physical function information, port information, and congestion information to the SDN management agent on at least one of the plurality of CPUs.

6. The NIC of claim 4, wherein at least one of the plurality of CPUs is linked to another CPU of the plurality of CPUs via the DHT based on the policy.

7. The NIC of claim 1, wherein the circuitry is further to permit a virtual Ethernet bridge (VEB) to control one or more traffic flows.

8. The NIC of claim 1, wherein the circuitry is further to receive, from the SDN management agent, network flow information associated with at least one CPU of the plurality of CPUs.

9. The NIC of claim 1, wherein the circuitry is further to receive, from the SDN management agent, telemetry data associated with at least one CPU of the plurality of CPUs.

10. One or more machine-readable non-transitory storage media storing a plurality of instructions, which, when executed on a processor, causes a network interface controller (NIC) to:
- program, according to a policy, a software defined networking (SDN) table providing one or more network flow mappings to Peripheral Component Interconnect Express (PCIe) physical functions allocated to a plurality of central processing units (CPUs), wherein a first CPU of the plurality of CPUs and a second CPU of the plurality of CPUs are to access data from different portions of memory by non-uniform memory access (NUMA); and
- direct an SDN management agent on at least one of a plurality of NUMA nodes to propagate the programmed SDN table to a local SDN table on the NUMA node.

11. The one or more machine-readable storage media of claim 10, wherein the plurality of instructions further causes the NIC to communicate control data to the SDN management agent executing on one of the plurality of CPUs.

12. The one or more machine-readable storage media of claim 11, wherein to communicate the control data to the SDN management agent comprises to communicate, via a distributed hash table (DHT), the control data to the SDN management agent.

13. The one or more machine-readable storage media of claim 12, wherein the plurality of instructions further causes the NIC to construct, via the DHT, a ring-based overlay network to enable at least one of the plurality of CPUs to communicate with another CPU.

14. The one or more machine-readable storage media of claim 13, wherein the DHT is to configure the NIC to transmit at least one of a CPU socket information, NIC physical function information, port information, and congestion information to the SDN management agent executing on at least one of the plurality of CPUs.

15. The one or more machine-readable storage media of claim 13, wherein at least one of the plurality of CPUs are linked to another CPU of the plurality of CPUs via the DHT based on the policy.

16. The one or more machine-readable storage media of claim 10, wherein the plurality of instructions further causes the NIC to configure a virtual Ethernet bridge (VEB) to control one or more traffic flows.

17. The one or more machine-readable storage media of claim 10, wherein the NUMA node is further to receive, from the SDN management agent, network flow information associated with at least one CPU of the plurality of CPUs.

18. The one or more machine-readable storage media of claim 10, wherein the plurality of instructions further causes the NIC to receive, from the SDN management agent, telemetry data associated with at least one CPU of the plurality of CPUs.

\* \* \* \* \*